US012469452B2

(12) United States Patent
Li et al.

(10) Patent No.: US 12,469,452 B2
(45) Date of Patent: *Nov. 11, 2025

(54) METHOD FOR DRIVING A DISPLAY PANEL AND DISPLAY DEVICE

(71) Applicant: Xiamen Tianma Micro-Electronics Co., Ltd., Xiamen (CN)

(72) Inventors: Jieliang Li, Xiamen (CN); Ming Yang, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,048

(22) Filed: Jun. 5, 2024

(65) Prior Publication Data

US 2024/0331636 A1 Oct. 3, 2024

Related U.S. Application Data

(63) Continuation of application No. 18/141,114, filed on Apr. 28, 2023, now Pat. No. 12,027,122, which is a continuation of application No. 17/859,310, filed on Jul. 7, 2022, now Pat. No. 11,663,972, which is a continuation of application No. 17/164,343, filed on Feb. 1, 2021, now Pat. No. 11,410,603.

(30) Foreign Application Priority Data

Oct. 20, 2020 (CN) ......................... 202011125984.8

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2320/0247* (2013.01); *G09G 2320/10* (2013.01)

(58) Field of Classification Search
CPC ... G09G 2320/0233; G09G 2320/0626; G09G 3/3696; G09G 2320/0252; G09G 3/36
See application file for complete search history.

(56) References Cited

U.S. PATENT DOCUMENTS

2019/0088200 A1* 3/2019 Woo ..................... H10K 59/352
2019/0371250 A1* 12/2019 Baek .................... G09G 3/3291
(Continued)

FOREIGN PATENT DOCUMENTS

CN 110136645 A 8/2019
CN 111710299 A 9/2020

*Primary Examiner* — Sanjiv D. Patel
(74) *Attorney, Agent, or Firm* — KDW Firm PLLC

(57) ABSTRACT

Provided are a method for driving a display panel, the method comprises a plurality of picture update periods, wherein at least one of the plurality of picture update periods comprises a first data write stage, a second data write stage, and a data retention stage; at least one of the first data write stage precedes at least one of the second data write stage; at the first data write stage, a gate scanning signal is provided for and a first data voltage is written to a pixel unit; at the second data write stage, the gate scanning signal is provided for and a second data voltage is written to the pixel unit, wherein theoretical brightness corresponding to the first data voltage is greater than theoretical brightness corresponding to the second data voltage.

38 Claims, 13 Drawing Sheets

(56) References Cited

U.S. PATENT DOCUMENTS

| | | | | |
|---|---|---|---|---|
| 2020/0020277 | A1* | 1/2020 | Lee | H10K 59/131 |
| 2020/0193910 | A1* | 6/2020 | Park | G09G 3/3266 |
| 2021/0264832 | A1* | 8/2021 | Seo | G09G 3/3233 |

* cited by examiner

METHOD FOR DRIVING A DISPLAY PANEL AND DISPLAY DEVICE

CROSS-REFERENCE TO RELATED APPLICATIONS

This is a continuation application of U.S. patent application Ser. No. 18/141,114 which is a continuation of U.S. patent application Ser. No. 17/859,310, filed on Jul. 7, 2022, which claims priority to Chinese Patent Application No. 202011125984.8 filed Oct. 20, 2020, disclosures of which are incorporated herein by reference in their entireties.

TECHNICAL FIELD

Embodiments of the present disclosure relate to the field of display technologies and, in particular, to a method for driving a display panel and a display device.

BACKGROUND

A drive transistor controls a drive current flowing through an organic light-emitting diode (OLED) so that a pixel circuit in an OLED display implements a display function. The magnitude of the drive current is related to the characteristic parameters of the drive transistor including a threshold voltage.

In an existing OLED display process, due to a difference in picture brightness between two different pictures displayed, screen brightness will slowly change in a switching process, and the brightness change process takes a relatively long time and is easy for human eyes to perceive, leading to the problem of screen flicker and a poor picture display effect. This has become an urgent problem to be solved for improving an OLED display quality.

SUMMARY

The present disclosure provides a method for driving a display panel and a display device, so as to compensate for the unstable electrical performance of a transistor, reduce a brightness difference and brightness change time, make a display picture reach target brightness faster, and solve the problem of screen flicker due to a hysteresis effect of the transistor when display pictures are switched.

In a first aspect, an embodiment of the present disclosure provides a method for driving a display panel, comprising a plurality of picture update periods, wherein at least one of the plurality of picture update periods comprises a first data write stage, a second data write stage, and a data retention stage.

At least one of the first data write stage precedes at least one of the second data write stage.

At the first data write stage, a gate scanning signal is provided for and a first data voltage is written to a pixel unit.

At the second data write stage, the gate scanning signal is provided for and a second data voltage is written to the pixel unit, wherein theoretical brightness corresponding to the first data voltage is greater than theoretical brightness corresponding to the second data voltage.

In a second aspect, an embodiment of the present disclosure further provides a pixel circuit, wherein the pixel circuit comprise a plurality of picture update periods, at least one of the plurality of picture update periods comprises a first data write stage, a second data write stage, and a data retention stage.

At least one of the first data write stage precedes at least one of the second data write stage.

At the first data write stage, the pixel circuit receives a gate scanning signal and is written with a first data voltage.

At the second data write stage, the pixel circuit receives the gate scanning signal and is written with a second data voltage, wherein theoretical brightness corresponding to the first data voltage is greater than theoretical brightness corresponding to the second data voltage.

In a third aspect, an embodiment of the present disclosure further provides a pixel circuit, wherein at least one of picture update period of the pixel circuit comprises a first data write stage, a second data write stage, and a data retention stage.

At least one of the first data write stage precedes at least one of the second data write stage.

At the first data write stage, the pixel circuit receives a gate scanning signal and is written with a first data voltage.

At the second data write stage, the pixel circuit receives the gate scanning signal and is written with a second data voltage, wherein theoretical brightness corresponding to the first data voltage is greater than theoretical brightness corresponding to the second data voltage.

The pixel circuit comprises a drive transistor and a bias adjustment module, the bias adjustment module is electrically connected to a first terminal of the drive transistor or a second terminal of the drive transistor.

In a fourth aspect, an embodiment of the present disclosure further provides a display panel, the display panel comprises a plurality of pixel units and a plurality of picture update periods, at least one of the plurality of picture update periods comprises a first data write stage, a second data write stage, and a data retention stage, and in at least one of the plurality of picture update periods, at least one of the first data write stage precedes at least one of the second data write stage. The display panel comprises a scanning drive unit and a data write unit.

The scanning drive unit is configured to provide a gate scanning signal for each of the plurality of pixel units at the data write stage and the data compensation stage, separately; and The data write unit is configured to write a first data voltage to the each of the plurality of pixel units at the first data write stage; and the data write unit is further configured to write a second data voltage to the each of the plurality of pixel units at the second data write stage, wherein theoretical brightness corresponding to the first data voltage is greater than theoretical brightness corresponding to the second data voltage.

DETAILED DESCRIPTION

Figure 1:
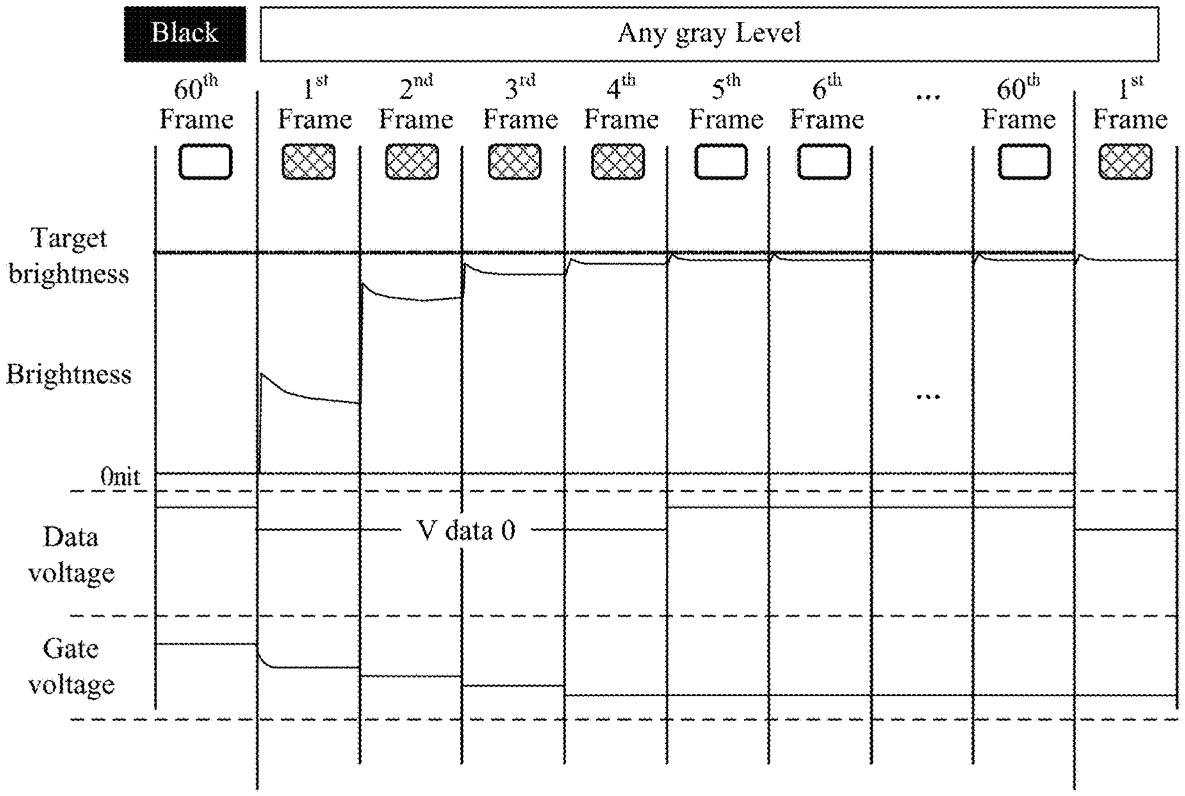
FIG. 1 is a schematic diagram of a picture brightness change of an OLED display panel in a research process of an inventor.

Hereinafter the present disclosure will be further described in detail in conjunction with the drawings and embodiments. It is to be understood that the embodiments set forth herein are intended to explain the present disclosure and not to limit the present disclosure. Additionally, it is to be noted that for ease of description, merely part, not all, of the structures related to the present disclosure are illustrated in the drawings.

FIG. 1 is a schematic diagram of a picture brightness change of an OLED display panel in a research process of an inventor. Referring to FIG. 1, exemplarily, in an example in which a picture refresh frequency of the display panel is less than 60 Hz, the inventor has found through research that when the OLED display panel switches from a black state to a display picture with certain brightness in a display driving process, a plurality of data refresh frames are configured and a data voltage is repeatedly written so that a pixel circuit can drive a plurality of frames to be displayed. In this process, the hysteresis effect of a drive transistor in the pixel circuit gradually weakens and the electrical performance of the drive transistor gradually stabilizes. As shown in FIG. 1, the first 4*s* (first four frames) is the process of refreshing and writing data voltages multiple times, during which the electrical performance of the transistor gradually stabilizes and the picture brightness of the display panel gradually increases and finally reaches target brightness in the 4th second. It is to be noted that in a data refresh and writing process in the first 4*s*, the data voltages written to the pixel circuit are the same and all are a theoretical data voltage Vdata0 corresponding to the target brightness of this picture update period. However, though the same data voltage is written, due to the hysteresis effect of the drive transistor, the actual brightness of a picture in the first few refresh frames has a relatively large difference from the target brightness, and human eyes can perceive and form the display effect of the picture. To solve the preceding problem, the embodiments of the present disclosure provide a method for driving a display panel.

Figure 2:
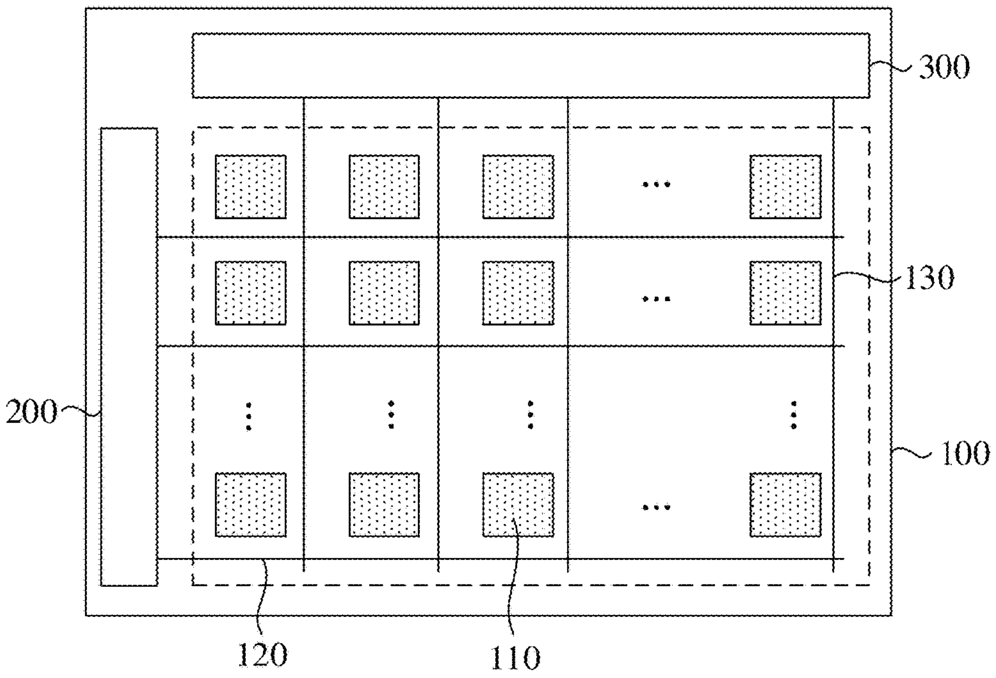
FIG. 2 is a structural diagram of a display device according to an embodiment of the present disclosure.
Figure 3:
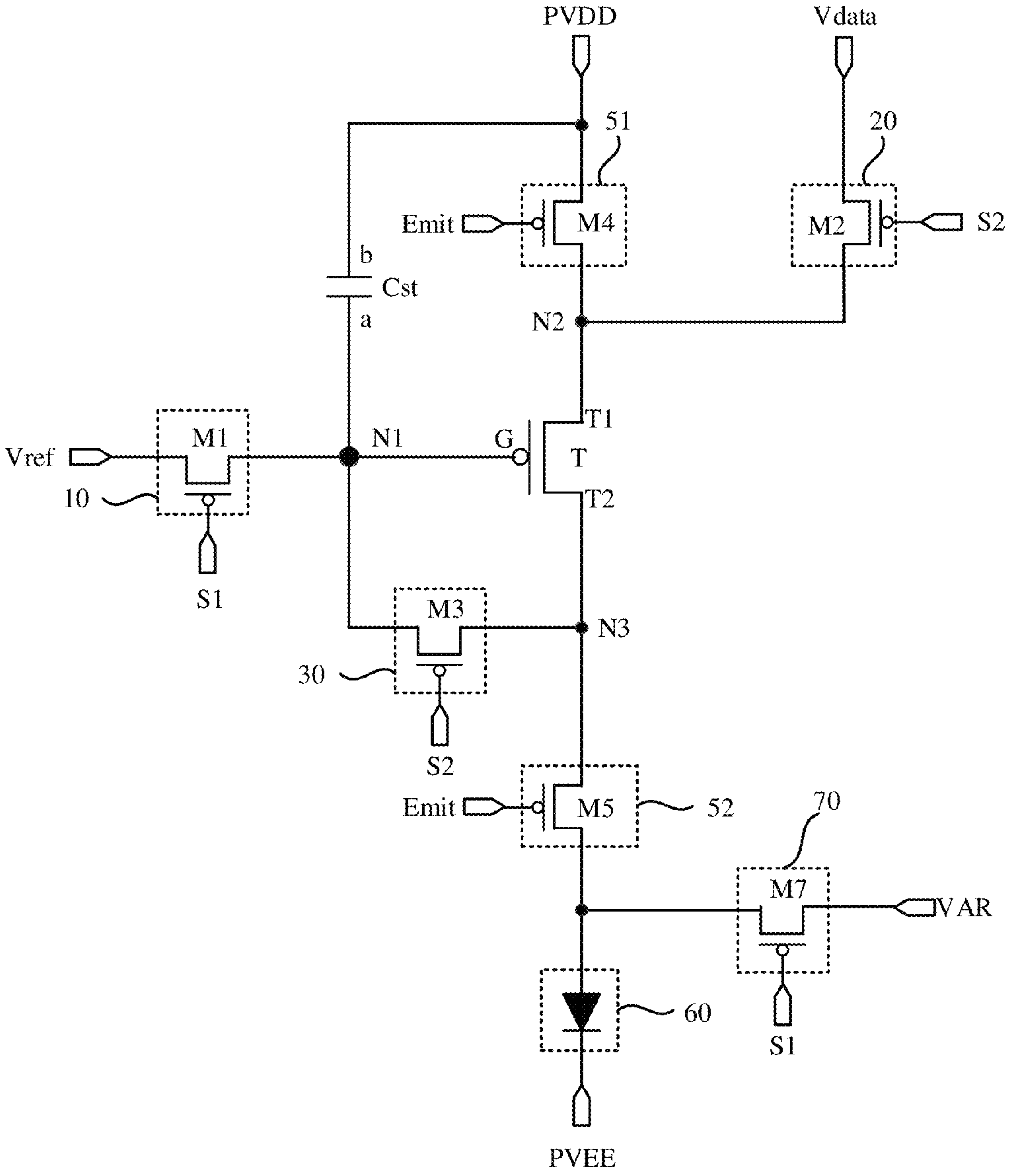
FIG. 3 is a structural diagram of a pixel circuit in the display device shown in FIG. 2.
Figure 4:
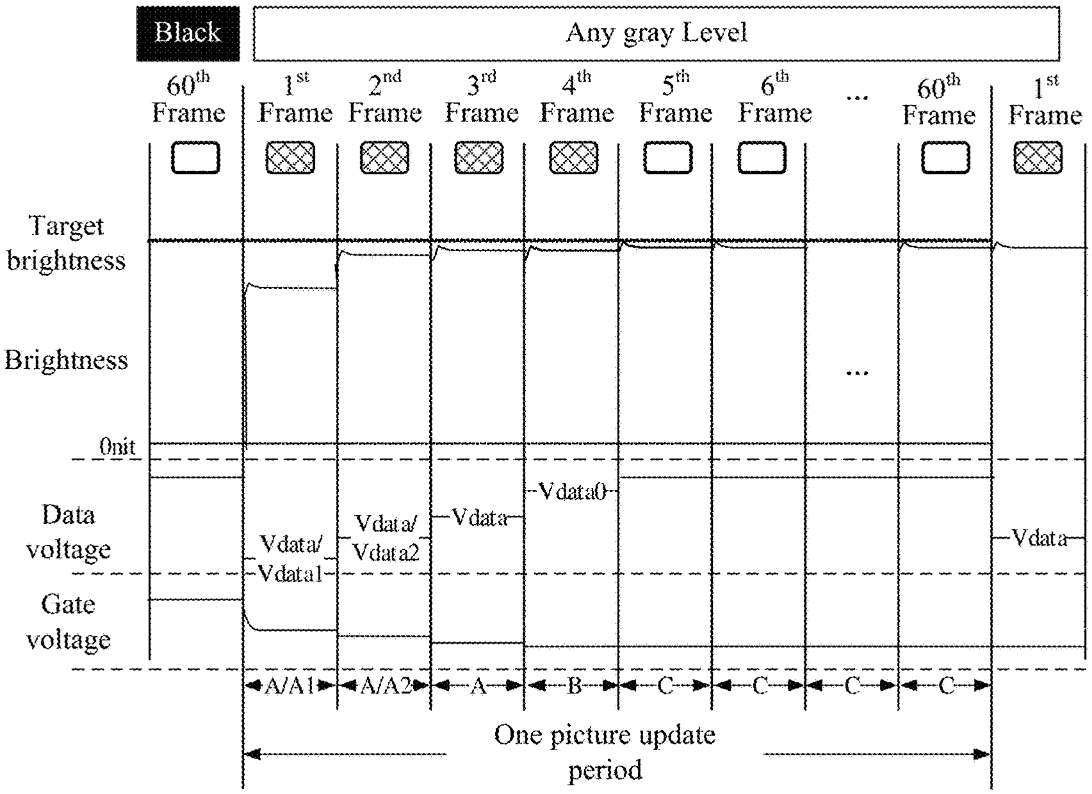
FIG. 4 is a timing diagram of a method for driving a display panel according to an embodiment of the present disclosure.

FIG. 2 is a structural diagram of a display device according to an embodiment of the present disclosure. FIG. 3 is a structural diagram of a pixel circuit in the display device shown in FIG. 2. FIG. 4 is a timing diagram of a method for driving a display panel according to an embodiment of the present disclosure. Firstly, the display device to which the method for driving a display panel provided by the embodiments of the present disclosure is directed will be described with reference to FIG. 2. The display device provided by the embodiments of the present disclosure specifically includes a display panel 100 and further includes a scanning drive unit 200 and a data write unit 300. The display panel 100 includes a plurality of pixel units 110. The pixel units 110 are generally arranged in an array along a row direction and a column direction. It may be set that the pixel units 110 include at least red pixel units, green pixel units, and blue pixel units. A full-color picture can be driven to be displayed through the color matching of the three primary colors of red, green, and blue.

With continued reference to FIGS. 2 and 3, specifically, the light emission driving process of each pixel unit 110 is essentially implemented by a pixel circuit disposed in correspondence with each pixel unit 110 in the display panel 100. The pixel circuit is equivalent to the pixel unit 110. The driving process of the pixel circuit will be exemplarily and briefly described by using a 7T1C pixel circuit shown in FIG. 3 as an example.

It is understandable that in addition to the pixel units 110, the display panel is further provided with a plurality of gate scanning lines 120 and a plurality of data signal lines 130, and the pixel circuit is electrically connected to the gate scanning line 120 and the data signal line 130, separately. The pixel circuit receives a gate scanning signal provided by the scanning drive unit 200 through the gate scanning line 120 and receives a data voltage signal provided by the data write unit 300 through the data signal line 130. According to the gate scanning signal and the data voltage signal, the pixel circuit drives the pixel unit 110 to emit light. In the 7T1C pixel circuit shown in FIG. 3, the gate scanning line 120 is electrically connected to a first scanning signal terminal S1, and the gate scanning signal may be provided for a gate of a drive transistor T in the pixel circuit through the first scanning signal terminal S1, thereby controlling the pixel circuit to turn on or off. The data signal line 130 is electrically connected to a data signal terminal Vdata, and the data voltage may be written to a storage capacitor Cst through the data signal terminal Vdata, thereby driving a light-emitting diode, that is, the pixel unit 110, to emit light through the drive transistor T.

Of course, the 7T1C pixel circuit shown in FIG. 3 is only an example of the embodiments of the present disclosure, and the method for driving a display panel provided by the embodiments of the present disclosure is also applicable to other pixel circuits which are not to be described here.

The method for driving a display panel provided by the embodiments of the present disclosure is mainly an improvement of a time sequence of the display panel in the picture update period. It is understandable that the display panel includes a plurality of picture update periods in the display driving process, where the display panel displays one picture in each picture update period. Microscopically, the picture displayed by the display panel is essentially a process of light emission of the plurality of pixel units arranged on the display panel. Macroscopically, the plurality of pixel units cooperate in color and brightness to display one picture. One picture update period of the display panel is essentially a process in which all the pixel units are driven to light up by their corresponding pixel circuits. In other words, in one picture update period of the display panel, each pixel circuit on the display panel is refreshed at least once. In a refresh process, the pixel circuit drives the pixel unit 110 to emit light at least once through the gate scanning signal and the data voltage signal provided by the gate scanning line 120 and the data signal line 130 respectively, and this process is referred to as a data write stage. In the refresh process, the pixel circuit drives the pixel unit 110 to emit light through merely the gate scanning signal provided by the gate scanning line 120 without the data voltage signal being written, and this process is referred to as a data retention stage.

The inventor has found through research that when the display panel needs to display a dynamic picture, 60 pictures might need to be refreshed within one second; but when a static picture is displayed for a period of time, one pixel unit, as an example, might only need to retain the same brightness within one second or consecutive seconds, so there is no need for continuous data write within the one second. For example, with respect to data write for each of 60 frames in one second in the case of high-frequency driving, the display panel provided by the embodiments of the present disclosure includes low-frequency driving, for example, only part of the 60 frames in one second do not need data write. That is, in the embodiments of the present application, for each pixel unit and each pixel circuit, the picture update period of the display panel includes one data write stage and a plurality of data retention stages.

It is understandable that in some embodiments of the present application, the display panel may include both the low-frequency driving and the high-frequency driving, one of which is selected according to picture requirements.

It is understandable that not all signal lines adopt the low-frequency driving in the present application. In an embodiment, a low-frequency drive signal in the present application mainly refers to a data signal or a signal of a data signal written module. It is understandable that the driving process of the pixel circuit requires a plurality of scanning signals to cooperate with a plurality of control signals, and signals on other signal lines in the pixel circuit may also adopt the low-frequency driving. Specifically, as shown in FIG. 4, that the display panel refreshes 60 pictures within one second essentially refers to that the pixel circuit corresponding to each pixel unit on the display panel receives 60 effective pulses of the light emission control signal Emit within one second, and each pixel unit emits light 60 times within the one second. It is understandable that the light emission driving process of the pixel unit is not limited to a process of being controlled by the light emission control signal Emit, and a working process of the corresponding pixel circuit for driving the pixel unit to emit light once may include a data voltage writing period and a light-emitting period, where the data voltage writing period is a preparation process in which the data voltage is written to the storage capacitor, and the light-emitting period is a process in which light emission is directly controlled by the light emission control signal Emit. That is to say, the picture update period in the present application may include at least one first data write stage, at least one second data write stage, and at least one data retention stage. The first data write stage, the second data write stage and the data retention stage each correspond to at least one light emission process of the pixel circuit.

The method for driving a display panel provided by the embodiments of the present disclosure will be specifically described below. In the method for driving a display panel provided by the embodiments of the present disclosure, the display panel includes the plurality of picture update periods, and it may be set that at least one picture update period includes the first data write stage, the second data write stage, and the data retention stage; and at least one of the first data write stage precedes at least one of the second data write stage.

The display panel generally updates a plurality of pictures when performing display, and not all of the plurality of pictures have the same brightness. The picture update period refers to a process of displaying a certain updated picture within a certain period of time. It may be set that each picture update period includes a plurality of stages such as the first data write stage, the second data write stage, or the data retention stage, and the display panel may be driven to display the picture at each stage. For example, the display of the picture corresponding to the current picture update period may be driven at the first few stages and retained at the later stages. Exemplarily, in an example in which the duration of the picture update period is 1s and the refresh frequency of the light emission control signal Emit of the display panel is 60 Hz, the display panel retains the display of the same picture within one second, which essentially means to refresh 60 identical pictures, that is, the picture update period of one second may be equally divided into 60 stages, each of which lasts $\frac{1}{60}$s. Of course, in the embodiments of the present disclosure, each stage in the picture update period may be configured with a different duration according to actual requirements, which is not limited here.

The picture update period in the method for driving a display panel provided by the embodiments of the present disclosure is specifically described below with reference to the drawings. Referring to FIGS. 2 to 4, specifically, in the method for driving a display panel, in an embodiment, at the data compensation stage A, the gate scanning signal is provided for and a compensation data voltage is written to the pixel unit 110, where the compensation data voltage is less than a target data voltage.

In the embodiments of the present disclosure, a process of driving the display panel is essentially a process of driving the plurality of pixel units on the display panel synchronously or successively. Generally, when the display panel displays a picture, a corresponding data voltage is written to each pixel unit 110 to drive the pixel unit to emit light at corresponding brightness, thereby implementing the picture display of the entire display panel. Therefore, for all the pixel units 110 on the display panel, when data voltages are written, the corresponding pixel units 110 need to be turned on in sequence through gate scanning signals provided by the gate scanning lines 120 and data voltage signals are written through the data signal lines 130.

In other words, the second data write stage in fact includes sequentially writing data to the plurality of pixel units in cooperation with scanning lines. For convenience of description, this embodiment will use one pixel unit as an example. The data compensation stage and the data retention stage are similar and thus are not described in detail.

Referring to a plurality of first data write stages A in FIG. 4, the first data write stage is essentially a process of writing the first data voltage to the pixel unit. In this process, after the compensation data voltage is written, the pixel unit is driven for display. However, the brightness of the pixel unit or the display panel is affected by the hysteresis effect of the drive transistor in the pixel circuit, so that the brightness of the pixel unit or the display panel is essentially inconsistent with theoretical brightness corresponding to the first data voltage. For the OLED display panel, the brightness of the pixel unit is positively correlated to a current flowing through the drive transistor in the pixel circuit, and the current flowing through the drive transistor is inversely proportional to the data voltage written to the pixel unit. Based on this, in the embodiments of the present disclosure, it is set that the first data voltage written at the first data write stage is less than the second data voltage, and then the brightness of the pixel unit or the display panel will be greater than the target brightness of the current picture update period in theory. However, due to the hysteresis effect of the drive transistor in the pixel circuit, the first data voltage will compensate the brightness of the pixel unit that cannot reach expected brightness due to the hysteresis effect and may even make the brightness of the pixel unit equal to the target brightness instead of making the brightness of the pixel unit greater than the target brightness of the current picture update period. In other words, at the first data write stage, a smaller first data voltage is written, so that higher picture brightness can be actually obtained. Moreover, since the higher picture brightness at the first data write stage approximates to the target brightness, the time to reach the target brightness can be shortened to a certain degree. Therefore, in the picture update period, before the target brightness is reached, a brightness difference between different frames is relatively small, brightness buffering time is shortened, the target brightness can be reached faster, and the display effect of the picture is ensured.

In an embodiment, the target data voltage is a theoretical data voltage corresponding to the target brightness of the current picture update period. It can be understood that when the display panel displays, a control module gives an instruction or a signal to require the display panel to display a target brightness. The control module can be a control unit inside the display panel, such as an IC; the control module can also be an external control unit or an external processor that can provide instructions, such as a CPU.

In an embodiment, the different pictures mentioned in this application may include pictures with different brightness. Pictures with different brightness can be understood as pictures with different grayscales. It can be understood that the picture has 256 gray levels from white to black, G0 represents a black picture, G255 represents a white picture, and the brightness of the black picture is lower than the brightness of the white picture, that is, in some embodiments of the present application, one picture update period corresponds to one target brightness.

It can be understood that, unless otherwise specified in the following, the data write stage can be understood as the second data write stage, and the data compensation stage can be understood as the first data write stage.

In an embodiment, at the data write stage, the gate scanning signal is provided for and the target data voltage is written to the pixel unit 110.

Referring to the data write stage B in FIG. 4, the data write stage B needs to be configured after the data compensation stage A in the same picture update period. It can be known from the above data compensation stage that through the data compensation process, the electrical performance of the drive transistor in the pixel circuit tends to be stable, and a threshold of the drive transistor reaches a theoretical value. Therefore, at this stage, data write and display driving may be performed according to a pixel circuit with stable electrical performance. At this stage, the theoretical data voltage corresponding to the target brightness of the current picture update period is written to the pixel unit, so that the pixel circuit normally drives the pixel unit or the display panel to display the picture at the target brightness.

It is understandable that the target data voltage at this stage may be a data voltage value within a certain range. For the display panel, the target brightness may in fact be a brightness value within an allowable error range, and the corresponding theoretical data voltage may be a data voltage value within an allowable range. After a data voltage within the allowable range is written, the brightness of the displayed picture reaches brightness within an expected brightness range.

In an embodiment, at the data retention stage, no data voltage is written to the pixel unit. Specifically, the gate scanning signal is provided for and no data voltage signal is written to the pixel unit 110. Referring to a plurality of data retention stages C in FIG. 4, the data retention stage is essentially a picture retention stage. A data voltage at the data retention stage is consistent with that at the previous stage. In the pixel circuit, the storage capacitor at the data retention stage stores the data voltage at the previous stage, that is, a gate potential of the drive transistor remains the data voltage at the previous stage. Therefore, when light emission is driven at the data retention stage, there is no need to rewrite the data voltage, and the brightness is the same as that at the previous stage in theory. Therefore, it is understandable that in this embodiment, the data retention stage should be configured after the data write stage or the data compensation stage. The data voltage written at the data write stage or the data compensation stage may be stored in the capacitor of the pixel circuit, and there is no need to rewrite the data voltage at the data retention stage. In a process of refreshing the display of the pixel unit, the pixel unit is turned on and driven by simply providing the light emission control signal, so that the display panel can retain the picture. It is to be noted that as shown in FIG. 4, the data voltage at the data retention stage C is merely a data voltage reference value rather than a written data voltage and used for a comparison to illustrate the compensation data voltage Vdata written at the data compensation stage A and the target data voltage Vdata0 written at the data write stage B. For example, at the data retention stage, a switch for controlling an input of a data signal in the pixel circuit is turned off, so that no data signal will be inputted into the pixel circuit regardless of the signal on the data signal line. For example, in FIG. 3, at the data retention stage, a second transistor M2 (which will be described in detail later) in the pixel circuit is in an off state.

The embodiments of the present disclosure provide the method for driving a display panel. The display panel is configured to include the plurality of picture update periods in the display driving process, where at least one of the plurality of picture update periods includes the data write stage, the data retention stage, and the data compensation stage; the data compensation stage is configured to precede the data write stage; at the data compensation stage, the gate scanning signal is provided for and the compensation data voltage is written to the pixel unit, where the compensation data voltage is less than the target data voltage which is the theoretical data voltage corresponding to the target brightness of the current picture update period; at the data write stage, the gate scanning signal is provided for and the target data voltage is written to the pixel unit; and at the data retention stage, no data voltage is written to the pixel unit, so that the display panel implements the data compensation process in at least one picture update period, thereby quickly improving the display brightness of the display panel in the data compensation process. The embodiments of the present disclosure can solve the problem of screen flicker due to the hysteresis effect of the transistor, compensate for the unstable electrical performance of the transistor, ensure that the target brightness of the current picture update period is reached as soon as possible when pictures are switched, and reduce a picture brightness difference in the same picture update period, thereby improving picture display quality and effect. Moreover, the compensation data voltage is less than the target data voltage, so that an input frequency of the data signal can be further reduced, thereby reducing power consumption.

Figure 5:
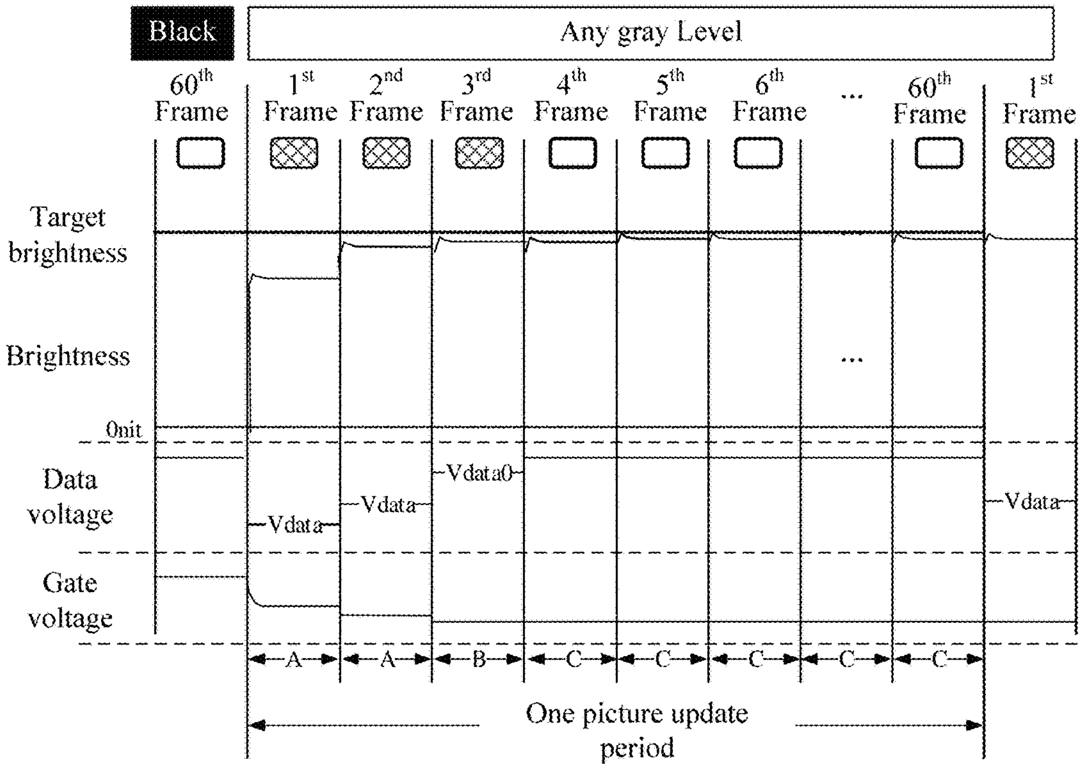
FIG. 5 and FIG. 6 are timing diagrams of another two methods for driving a display panel according to an embodiment of the present disclosure.
Figure 6:
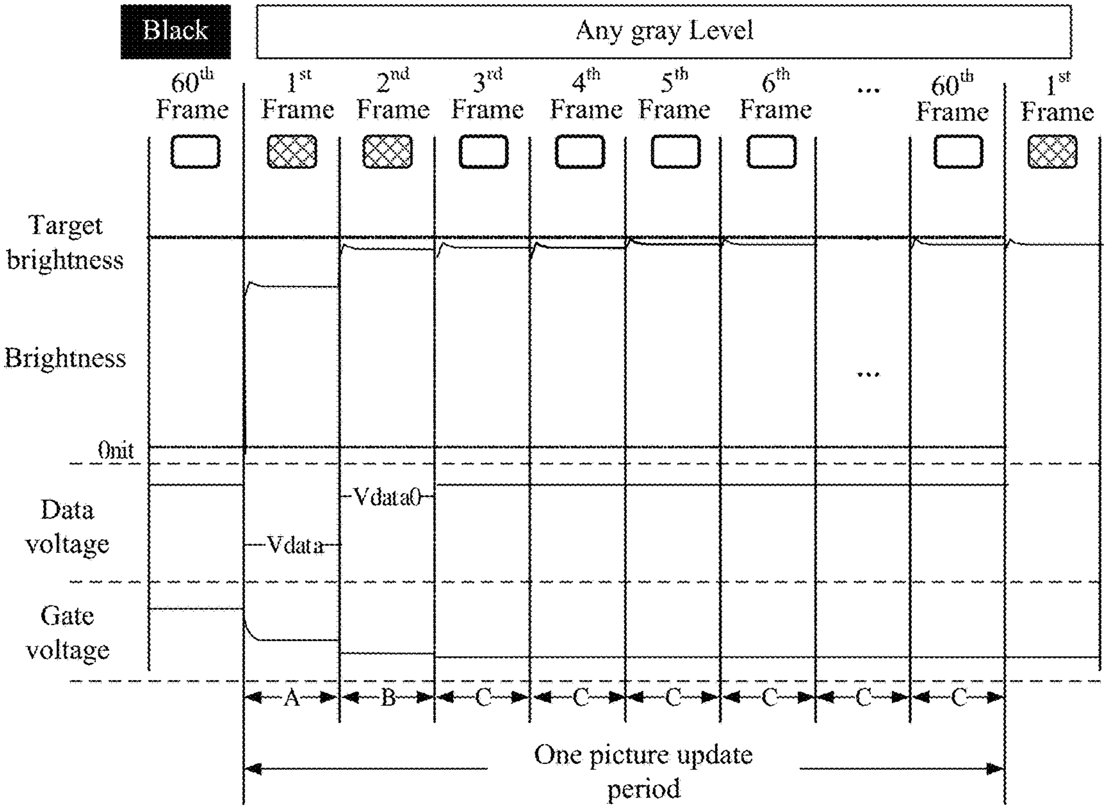

It is to be noted that three data compensation stages A, one data write stage B, and multiple data retention stages C are exemplarily set in FIG. 4, and the numbers of the preceding stages are not limited here. It is understandable that in the same picture update period, the data compensation stage needs to be set according to the specific situation of the hysteresis effect of the drive transistor in the pixel circuit in the display panel and also needs to be set according to an actual effect of compensation data written at the data compensation stage. Specifically, in the same picture update period, more than one and fewer than five data compensation stages may be set before the data write stage and meanwhile one data write stage may be set. On the one hand, a certain number of data compensation stages can be used for effectively compensating the brightness of the picture, effectively improving the display brightness of the picture before the target brightness is reached, and stabilizing the threshold of the drive transistor as soon as possible. On the other hand, fewer data write stages can be used for reducing data writing processes of the display panel and the frequency at which the display panel is driven, thereby reducing the power consumption of the display panel. Those skilled in the art may set the number of the data compensation stages in the same picture update period according to the actual compensation effect of the panel. FIGS. 5 and 6 are timing diagrams of another two methods for driving a display panel according to an embodiment of the present disclosure. Referring to FIGS. 4 to 6, exemplarily, for the process of driving the display panel in which the picture update period is is and the drive frequency of the light emission control signal Emit is 60 Hz, it may be set that the same picture update period includes one to three data compensation stages A (that is, one to three data compensation frames), one data write stage B configured immediately after the data compensation stages (that is, one data write frame), and all data retention stages C configured after the data write stage (that is, multiple data retention frames).

In addition, it is to be noted that the data write stage is essentially an important stage for the display panel to display the picture and determines the display brightness of the pixel unit in the entire picture update period. In addition to the data write stage, the picture update period provided by the preceding embodiments further includes the data compensation stage and the data retention stage. The data retention stage can reduce the number of data write stages and is mainly used for reducing the drive frequency and the power consumption of the panel. Meanwhile, in the embodiments of the present disclosure, the data compensation stage is added before the data write stage, an object of which is to improve the buffering process of panel brightness in the picture update period. It is understandable by those skilled in the art that in the entire process of driving the display panel, that is, in the plurality of picture update periods, it is set that at least one of the plurality of picture update periods includes the data compensation stage and the data retention stage, and it may also be set that the data compensation stage and the data retention stage are not configured in other picture update periods. In this case, at least one of the plurality of picture update periods includes merely the data write stages and adopts the high-frequency driving mode. Of course, as analyzed below, the picture update period is a picture update period in the case of the high-frequency driving in the present application and corresponds to an increased frequency.

For example, if the frequency of the high-frequency driving for the picture update period is 60 Hz, 60 frames are present in one second, each frame is the data write stage, the frequency of the data write stage is 60 Hz, and the picture update period corresponds to a frequency of 60 Hz. In the embodiments of the present application, in the case of the low-frequency driving, although the picture update period still includes 60 frames, that is, 60 stages (that is, the total number of the data write stage, the data retention stage, and the data compensation stage in the picture update period is 60), the target data voltage may be written only once. At this time, the frequency of the data write stage is reduced to 1 Hz and the picture update period corresponds to a frequency of 1 Hz.

In addition, it is to be noted that though the picture may change at the data retention stage in the embodiments of the present application, a time period that includes merely the data retention stages is not regarded as an independent picture update period. A complete period including the data write stage, the data retention stage, and the data compensation stage is regarded as the picture update period in the case of low-frequency driving in the present application. Of course, in some optional embodiments of the present application, at least one picture update period may only include the data write stage and the data retention stage.

Moreover, unless otherwise specified, the picture update period below is the picture update period in the case of low-frequency driving.

Further, the inventor has found through researches that in an actual picture switching process of the display panel, an effect of the hysteresis effect of the drive transistor in the pixel circuit is related to a picture displayed by the display panel. Specifically, the hysteresis effect of the drive transistor has a significant effect when the brightness of the current picture update period is greater than the brightness of the previous picture update period. In this case, for the pixel unit and the pixel circuit, a lower data voltage signal needs to be written to the pixel circuit, so that the drive transistor in the pixel circuit generates a higher drive current in the light emission process, so as to drive the light-emitting diode to emit light at higher brightness. However, due to the hysteresis effect of the drive transistor, a threshold voltage Vth of the drive transistor deviates greatly in an earlier data write stage in the current picture update period, so that the drive transistor generates a relatively small drive current and cannot perform normal driving. At this time, the brightness of the pixel unit will be lower than the target brightness, which will lead to unsatisfactory picture display brightness and a poor display effect in the current picture update period.

Based on this, in an embodiment, in the method for driving a display panel provided by the embodiments of the present disclosure, the plurality of picture update periods includes at least one first picture update period and at least one second picture update period; where the brightness of the first picture update period is greater than the brightness of a previous picture update period (that is a picture update period before the first picture update period), and the first picture update period includes the data write stage, the data retention stage, and the data compensation stage; and the brightness of the second picture update period is less than or equal to the brightness of a previous picture update period (that is a picture update period before the second picture update period), and the second picture update period includes the data write stage and the data retention stage. In other words, when the brightness of the current picture update period is greater than the brightness of the previous picture update period, the current picture update period includes the data compensation stage, the data write stage, and the data retention stage; when the brightness of the current picture update period is less than or equal to the brightness of the previous picture update period, the current picture update period includes the data write stage and the data retention stage.

When the brightness of the first picture update period is greater than the brightness of the previous picture update period, in a brightness switching process of the display panel, due to the hysteresis effect of the drive transistor, the actual brightness is lower than the target brightness when the target data voltage is written. Therefore, the first picture update period is further configured with the data compensation stage in addition to the data write stage and the data retention stage. Through data compensation, higher brightness can be obtained at the data compensation stage, so that in the picture switching process, the brightness is improved significantly and can reach the target brightness faster. When the brightness of the second picture update period is less than or equal to the brightness of the previous picture update period, the second picture update period includes merely the data write stage and the data retention stage and may not be configured with the data compensation stage. Conversely, when the displayed picture switches from high brightness to low brightness, that is, in an nth picture update period and an (n+1)th picture update period that are adjacent, a picture with high brightness is displayed in the nth picture update period and a picture with low brightness is displayed in the (n+1)th picture update period, the drive current of the pixel circuit is relatively large and a gate-source voltage of the drive transistor is relatively large in the nth picture update period, and the drive current of the pixel circuit is reduced and the gate-source voltage of the drive transistor becomes smaller in the (n+1)th picture update period. That is, the gate-source voltage of the drive transistor tends to decrease, the current of the drive transistor becomes smaller, and the threshold voltage Vth of the drive transistor will not deviate greatly, so that the drive transistor has relatively stable electrical performance and data compensation is not required.

With this embodiment, targeted brightness compensation can be performed for each picture update period of the display panel to ensure that the actual brightness of the display panel meets the requirement for the target brightness in each picture update period, thereby improving the display effect of the display panel and avoiding the screen flicker of the display panel; meanwhile, the data compensation stage selectively added to a particular picture update period can reduce times the data write unit writes data signals in other picture update periods, thereby reducing the power consumption of the entire display panel.

The embodiments of the present disclosure provide multiple implementations for the setting of values of the compensation data voltages at the data compensation stages in the picture update period. With continued reference to FIG. 4, in an embodiment, the same picture update period includes a plurality of data compensation stages A, the plurality of data compensation stages A include a first data compensation stage A1 and a second data compensation stage A2, the first data compensation stage A1 precedes the second data compensation stage A2, and a compensation data voltage written at the second data compensation stage A2 is greater than a compensation data voltage written at the first data compensation stage A1.

As shown in FIG. 4, the first data compensation stage A1 precedes the second data compensation stage A2, and the compensation data voltages corresponding to the two stages satisfy that Vdata1<Vdata2. It is understandable that with the compensation at the data compensation stages, the electrical performance of the drive transistor in the pixel circuit gradually stabilizes and a threshold drift of the transistor has an ever smaller effect on the display brightness. In this case, it is set that the compensation data voltage at the second data compensation stage is less than the compensation data voltage at the first data compensation stage, which can ensure that the actual brightness of the picture will not exceed the target brightness of the current picture update period and ensure stable and gradual brightness changes.

In an embodiment, with continued reference to FIG. 4, the same picture update period includes a plurality of data compensation stages A that are arranged in chronological order, where compensation data voltages Vdata written at the plurality of data compensation stages A increase in sequence. It can be known from the brightness at the data compensation stages in FIG. 4 that the compensation data voltages written at the plurality of data compensation stages are configured to increase in sequence, so that their corresponding theoretical picture display brightness gradually decreases, the actual brightness gradually increases with the data compensation, and the picture brightness increases to the target brightness corresponding to the current picture update period when the compensation voltage increases to the target data voltage.

Of course, considering that the actual effect of the hysteresis effect of the drive transistor needs to be determined by simulations or experiments, compensation data voltages corresponding to some individual data compensation stages among the configured multiple data compensation stages may decrease. In the case where it is ensured that the compensation data voltages at the multiple data compensation stages increase as a whole, it is not limited that the compensation data voltages corresponding to any adjacent two data compensation stages increase.

Figure 7:
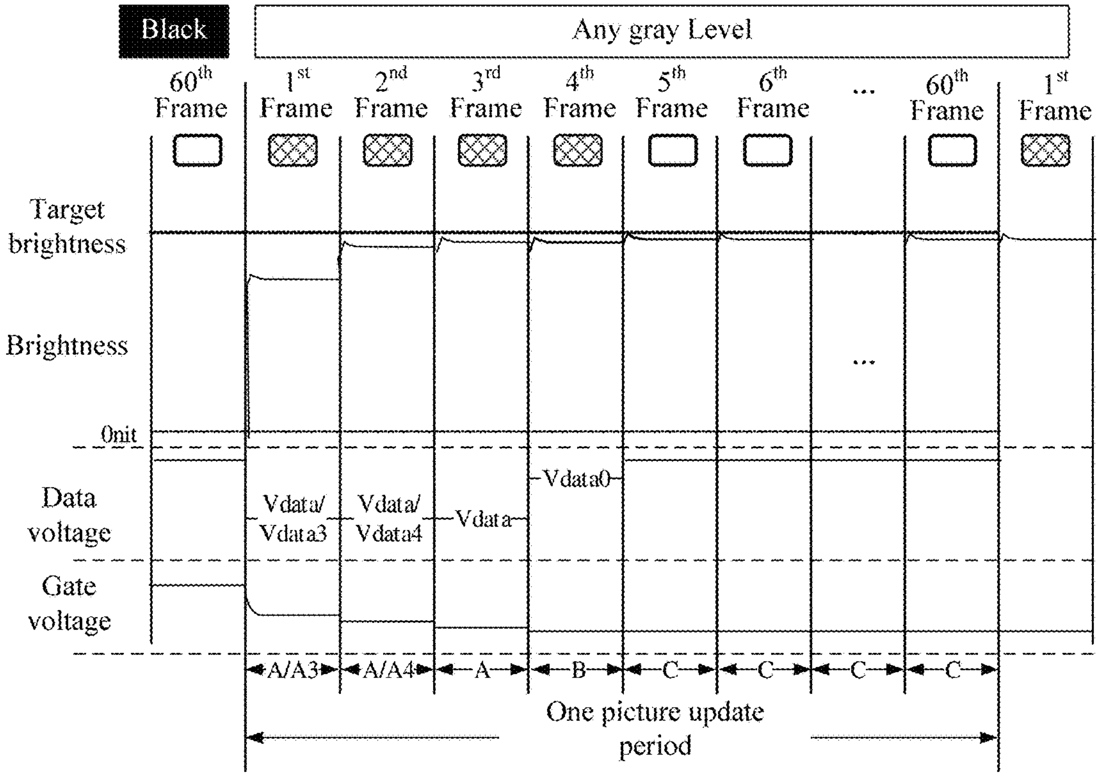
FIG. 7 is a timing diagram of another method for driving a display panel according to an embodiment of the present disclosure.

In an embodiment, in another embodiment of the present disclosure, it may be set that the same picture update period includes a plurality of data compensation stages, the plurality of data compensation stages include a third data compensation stage and a fourth data compensation stage, the third data compensation stage precedes the fourth data compensation stage, and a compensation data voltage written at the fourth data compensation stage is equal to a compensation data voltage written at the third data compensation stage. FIG. 7 is a timing diagram of another method for driving a display panel according to an embodiment of the present disclosure. The compensation data voltages at the data compensation stages in this embodiment are specifically described with reference to FIG. 7. The same picture update period includes the data compensation stage A, the data write stage B, and the data retention stage C, where the data compensation stage A precedes the data write stage B.

The third data compensation stage A3 and the fourth data compensation stage A4 in FIG. 7 are used as an example. The third data compensation stage A3 precedes the fourth data compensation stage A4, and the compensation data voltages corresponding to the two stages satisfy that Vdata3=Vdata4. It can be known from the embodiment in FIG. 4 that with the compensation at the data compensation stages, the electrical performance of the drive transistor in the pixel circuit gradually stabilizes; the compensation data voltages written at the plurality of data compensation stages are configured to increase in sequence, so that the corresponding theoretical picture display brightness gradually decreases, the actual brightness gradually increases with the data compensation, and the picture brightness increases to the target brightness corresponding to the current picture update period when the compensation voltage increases to the target data voltage. Based on this, those skilled in the art may reasonably set the values of the compensation data voltages written at the data compensation stages, so that the same compensation data voltage is written at the plurality of data compensation stages before the data write stage, that is, Vdata3 is equal to Vdata4. It can be known from the brightness at the data compensation stages in FIG. 7 that on the basis of ensuring that the value of the compensation data voltage is less than that of the target data voltage, that is, on the basis of ensuring that the theoretical brightness corresponding to the compensation data voltage is higher than the target brightness, the values of the compensation data voltages Vdata3 and Vdata4 may be reasonably increased to decrease the theoretical brightness, thereby ensuring that after the electrical performance of the drive transistor is stable, the brightness at the data compensation stages will not exceed or significantly exceed the target brightness, ensuring stable changes of the brightness at the data compensation stages, and avoiding the screen flicker.

The same compensation data voltage is written at the third data compensation stage A3 and the fourth data compensation stage A4 as shown in FIG. 7, so that in a process of writing the compensation data voltage at the two data compensation stages, the data write unit does not need to change an output value of the compensation data voltage, which can reduce the complexity of a data voltage outputted by the data write unit, reduce the calculation amount of the data write unit, and reduce the power consumption of the data write unit to a certain degree.

Further, in an embodiment, at least one data retention stage may be configured between the third data compensation stage and the fourth data compensation stage. The data voltage written at the previous data write stage B or the data compensation stage A is written at the data retention stage C for display. When at least one data retention stage C is configured between the third data compensation stage A3 and the fourth data compensation stage A4, the at least one data retention stage C can retain the picture display at the brightness of the third data compensation stage A3. In this case, the drive transistor in the pixel circuit maintains the same external state at the data retention stage C and the third data compensation stage A3, that is, the gate-source voltage remains consistent. Therefore, the data retention stage C can not only compensate the brightness of the pixel unit or the display panel but also reduce the deviation of the threshold voltage Vth of the drive transistor, so that the electrical performance of the drive transistor tends to be stable. Further, since no compensation data voltage needs to be written at the data retention stage C, the data write unit writes data fewer times, thereby further reducing power consumption.

In some embodiments of the present application, the embodiments of the present disclosure provide multiple examples for a relationship of the compensation data voltages at the plurality of data compensation stages in the same picture update period. In an embodiment, when the same picture update period includes a plurality of data compensation stages, it may be set that compensation data voltages written in correspondence to the plurality of data compensation stages are in an arithmetic sequence, a geometric sequence, or an exponential sequence.

For the compensation data voltages in the arithmetic sequence, the geometric sequence, or the exponential sequence, the corresponding theoretical brightness at the plurality of data compensation stages is also in an arithmetic sequence, a geometric sequence, or an exponential sequence. Meanwhile, with data compensation, the hysteresis effect of the drive transistor gradually weakens, so the theoretical brightness at the data compensation stages may decrease. It may be set that the compensation data voltages increase to make the corresponding theoretical brightness decrease, so that when the compensation data voltage reaches the target data voltage, the electrical performance of the drive transistor becomes stable and the brightness of the display panel reaches the target brightness.

Further, on this basis, it is necessary to reasonably set the specific values of the compensation data voltages, so as to effectively alleviate the hysteresis effect of the drive transistor and increase the brightness at compensation stages by use of appropriate compensation data voltages. In an embodiment, a first data compensation stage among the plurality of data compensation stages in the same picture update period is an initial data compensation stage, and it may be set that a compensation data voltage written at the initial data compensation stage is Vdata=Vdata0×L1/L2; where L2 is target brightness of the picture update period, Vdata0 is a target data voltage corresponding to the target brightness of the picture update period, and L1 is actual brightness when the target data voltage is written to the pixel unit at the initial data compensation stage.

It is understandable that when the target data voltage is written to the pixel unit at the initial data compensation stage, the brightness of the pixel unit or the display panel cannot reach the target brightness corresponding to the target data voltage due to the hysteresis effect of the drive transistor, that is, the brightness L1 is apparently lower than the target brightness. From another perspective, the brightness L1 essentially records information about the degree of the hysteresis effect of the drive transistor. Since the brightness is negatively correlated to the data voltage, a ratio of the brightness L1 to the target brightness L2 is essentially equal to a ratio of the target data voltage Vdata0 to a theoretical data voltage $Vdata_1$ corresponding to L1. The ratio is used as a ratio of the compensation data voltage Vdata written at the initial data compensation stage to the target data voltage Vdata0, so that it can be obtained that $Vdata=Vdata0^2/Vdata_1$. Therefore, it is understandable that the compensation data voltage Vdata written at the initial data compensation stage can make the theoretical brightness of the data compensation stage greater than the target brightness, reduce a decrease in picture brightness due to the hysteresis effect, and can targetedly compensate for the effect of the hysteresis effect of the drive transistor on the brightness.

In addition, in an embodiment, the first data compensation stage among the plurality of data compensation stages in the same picture update period is the initial data compensation stage, and the compensation data voltage written at the initial data compensation stage is Vdata=KVdata'; where Vdata' is a theoretical data voltage corresponding to the target brightness of the previous picture update period, and 0<K<1.

As described in the preceding embodiment, the premise for the addition of the data compensation stage to the picture update period includes that the brightness of the previous picture update period is lower than the brightness of the current picture update period. Based on this, to ensure that the data compensation process in the current picture update period is based on the brightness of the previous picture update period, it may be set that the compensation data voltage written at the initial data compensation stage is proportional to the data voltage in the previous picture update period. The specific value of a coefficient K needs to be determined according to the actual compensation effect of Vdata and can be obtained by those skilled in the art through experiments and simulations based on this relationship, which is not excessively limited here.

In addition, the same picture update period includes N data compensation stages, and it may be set that a data voltage corresponding to an nth data compensation stage is Vdata_n=Vdata0−(N−n+1)*x, where Vdata0 is the target data voltage corresponding to the target brightness of the current picture update period, n and N are positive integers, 1≤n≤N, and x=0.5V to 2V.

In this case, the compensation data voltages corresponding to the N data compensation stages are essentially in an arithmetic sequence with a common difference of x. It is set that the common difference x is within a range of 0.5V to 2V, which can ensure that the compensation data voltage at the data compensation stages changes slowly. According to the timing diagram in FIG. 4 after the compensation data voltage that increases in the arithmetic sequence is provided, the brightness of the display panel can gradually increase, and the brightness at the initial data compensation stage also remains at a relatively high level, so that the picture brightness of the entire picture update period more approximates to the target display brightness and the screen flicker is effectively avoided.

Figure 8:
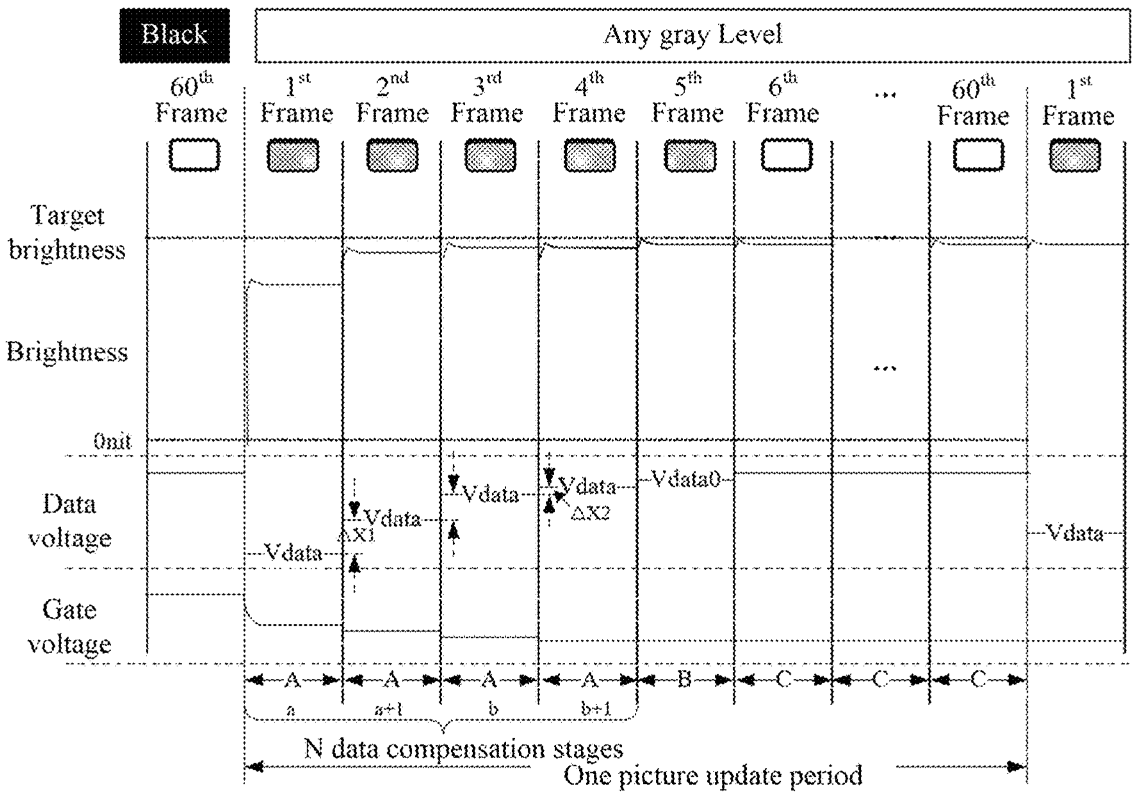
FIG. 8 is a timing diagram of another method for driving a display panel according to an embodiment of the present disclosure.

FIG. 8 is a timing diagram of another method for driving a display panel according to an embodiment of the present disclosure. Referring to FIG. 8, in another embodiment of the present disclosure, with the same picture update period including a plurality of data compensation stages A as an example, the same picture update period includes a first data compensation stage A to an Nth data compensation stage A, and it may be set that a difference between compensation data voltages written at an ath data compensation stage A and an (a+1)th data compensation stage A is ΔX1, and a difference between compensation data voltages written at a bth data compensation stage A and a (b+1)th data compensation stage A is ΔX2; where ΔX1>ΔX2, a and b are positive integers greater than 0, a+1≤b, and a, a+1, b, and b+1 are not greater than N.

The relationship between the ath data compensation stage A and the (a+1)th data compensation stage A is that the (a+1)th data compensation stage is adjacent to the ath data compensation stage and after the ath data compensation stage. That the (a+1)th data compensation stage is adjacent to the ath data compensation stage refers to that no other data compensation stage is present between the ath data compensation stage and the (a+1)th data compensation stage, but at least one data retention stage may be configured therebetween. The data voltage written at the previous data write stage or the data compensation stage is written at the data retention stage for display, so that the picture displayed at the ath data compensation stage can be retained. In addition, the compensation data voltage written at the (a+1)th data compensation stage and the ath data compensation stage gradually changes. At the two data compensation stages, the compensation data voltage gradually increases. Similarly, the relationship between the bth data compensation stage and the (b+1)th data compensation stage is that the (b+1)th data compensation stage is adjacent to the bth data compensation stage and after the bth data compensation stage. Moreover, taking the same picture update period including N data compensation stages as an example, a+1≤N and b+1≤N. In this case, not only the compensation data voltage written at the data compensation stages increases, but also the difference between adjacent two compensation data voltages is ever smaller. In other words, the theoretical brightness corresponding to the compensation data voltages has an ever smaller difference and more approximates to the target brightness.

The inventor has found through research that as time goes by, the threshold voltage drift of the drive transistor is increasingly stable and the electrical performance changes more and more slowly. In the embodiments of the present disclosure, the compensation data voltages with increasingly small differences are provided at the data compensation stages and the compensation data voltage changes more and more slowly so as to match the ever smaller hysteresis effect of the drive transistor and an increasingly small change amount of the threshold voltage Vth of the drive transistor, so that the brightness is compensated to an ever smaller degree and gradually approaches a normal state, thereby achieving normal driving and display. In this way, not only a small improvement in actual brightness due to insufficient brightness compensation at the time of initial data compensation can be avoided, but also the actual brightness exceeding the target brightness due to later excessive data compensation can be prevented.

In addition, considering actual data compensation duration, the proportion of the data compensation stage in the picture update period should have a certain upper limit, so as not to affect the normal picture display. Specifically, the proportion of the data compensation stage may be appropriately reduced in correspondence to the degree of the hysteresis effect of the driving transistor. In the embodiments of the present disclosure, it may be set that the same picture update period includes N data compensation stages, M data retention stages, and P data write stages; where N/(N+M+P)≤⅙, and N, M, and P are integers greater than or equal to 1.

In this case, for a driving process with the picture update period of is and a drive frequency of 60 Hz, the proportion of the data compensation stage should be less than or equal to 10 frames. Apparently, the proportion of the data compensation stage will not affect the duration of picture display at the target brightness. The human eyes perceive picture brightness with a relatively small difference from the target brightness, thereby achieving more accurate picture display and a better display effect.

In the picture update period described above, the data compensation stages are concentrated before the data write stage and the data retention stage is after the data write stage, which is merely an embodiment of the present disclosure. The embodiments of the present disclosure also provide multiple implementations for the positions of the data compensation stage and the data retention stage in the actual driving process.

In an embodiment, the same picture update period includes N data compensation stages, M data retention stages, and P data write stages; where N, M, and P are integers greater than or equal to 1; and n data retention stages exist between any adjacent two data compensation stages, where $0 \leq n \leq M$.

Figure 9:
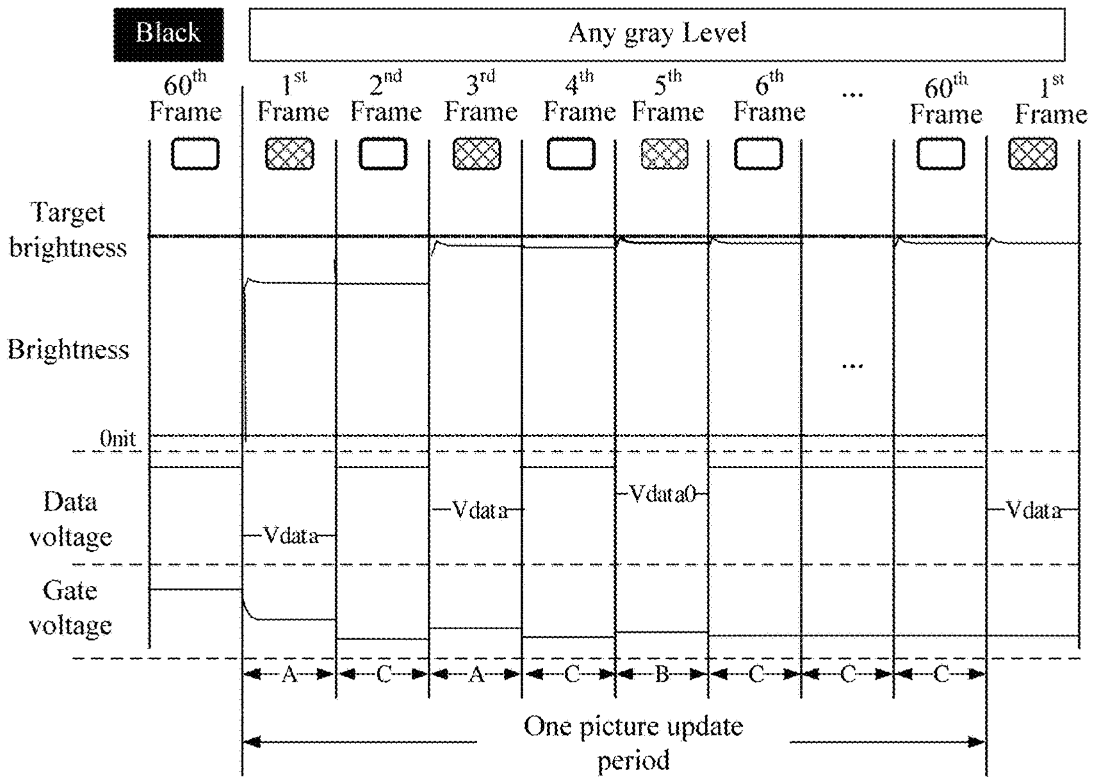
FIG. 9 is a timing diagram of another method for driving a display panel according to an embodiment of the present disclosure.

The data voltage written at the previous data write stage or the data compensation stage is written at the data retention stage for display, so as to retain the picture displayed at the previous data write stage or the data compensation stage. It is understandable that at least one data retention stage is configured between adjacent two data compensation stages, which can delay refreshing the picture displayed at the data compensation stage. In the process of display at the compensated brightness, the electrical performance of the drive transistor can gradually stabilize, thereby achieving brightness compensation. Specifically, when zero data retention stages exist between any two data compensation stages, it is the solution in which the data compensation stages are concentrated before the data write stage, which will not be repeated here. FIG. 9 is a timing diagram of another method for driving a display panel according to an embodiment of the present disclosure. Referring to FIG. 9, when one or more data retention stages C exist between any two data compensation stages A, due to the limited number of the data retention stages, at most M data retention stages may be configured between adjacent two data compensation stages. In addition, considering that the brightness of the display panel at the data compensation stages is lower than the target brightness, to ensure that the overall brightness of the entire picture update period more approximates to the target brightness, the number of data retention stages between adjacent two data compensation stages may be reasonably set. Moreover, at least part of the data retention stages should be configured after the data write stage. At this time, the picture with the target brightness, achieved at the data write stage, can be delayed to be displayed at the data retention stages, so that the display at the target brightness can be achieved as much as possible in the entire picture update period. For the solution in which all the data retention stages are configured after the data write stage, the data voltage signal written at the data write stage and stored in the pixel circuit will be lost due to a long time of data retention without the data voltage being written, or the actual data voltage that causes the drive transistor to operate and generate the drive current at the data retention stage is easy to be inaccurate or uncontrollable due to signal crosstalk or other reasons, so that the actual picture displayed at the data retention stage is different from the picture displayed at data write stage. In this embodiment, the data retention stage is configured between the data compensation stages or the data retention stage is configured between the data compensation stage and the data write stage, which can avoid that the picture retained for a long time at a large number of consecutive data retention stages is uncontrollable and ensure that the display brightness of the entire picture update period more approximates to the target brightness relatively accurately. Moreover, the data compensation stage and the data write stage can be more uniformly distributed in the entire picture update period, which prevents the data voltage from being intensively written at early stages of the picture update period.

Specifically, in the embodiments of the present disclosure, it may be set that the same picture update period includes a plurality of data compensation stages and a plurality of data retention stages, where at least one data retention stage exists between at least two data compensation stage. On this basis, the embodiments of the present disclosure provide specific solutions for the number and positions of the data retention stages between the data compensation stages.

With continued reference to FIG. 9, in an embodiment, it may be set that a same number of data retention stages exist between any adjacent two data compensation stages. In this case, the refresh of the compensated brightness at each data compensation stage can be delayed to a same extent, that is, the picture can be displayed at the compensated brightness, so as to ensure that the electrical performance of the drive transistor gradually stabilizes in this process. Moreover, since the data retention stage is added after the data compensation stage, the data retention stage has the compensated brightness with no data voltage being written to the pixel unit, which can save the times the compensation data voltage is written and reduce the power consumption of the display panel.

Figure 10:
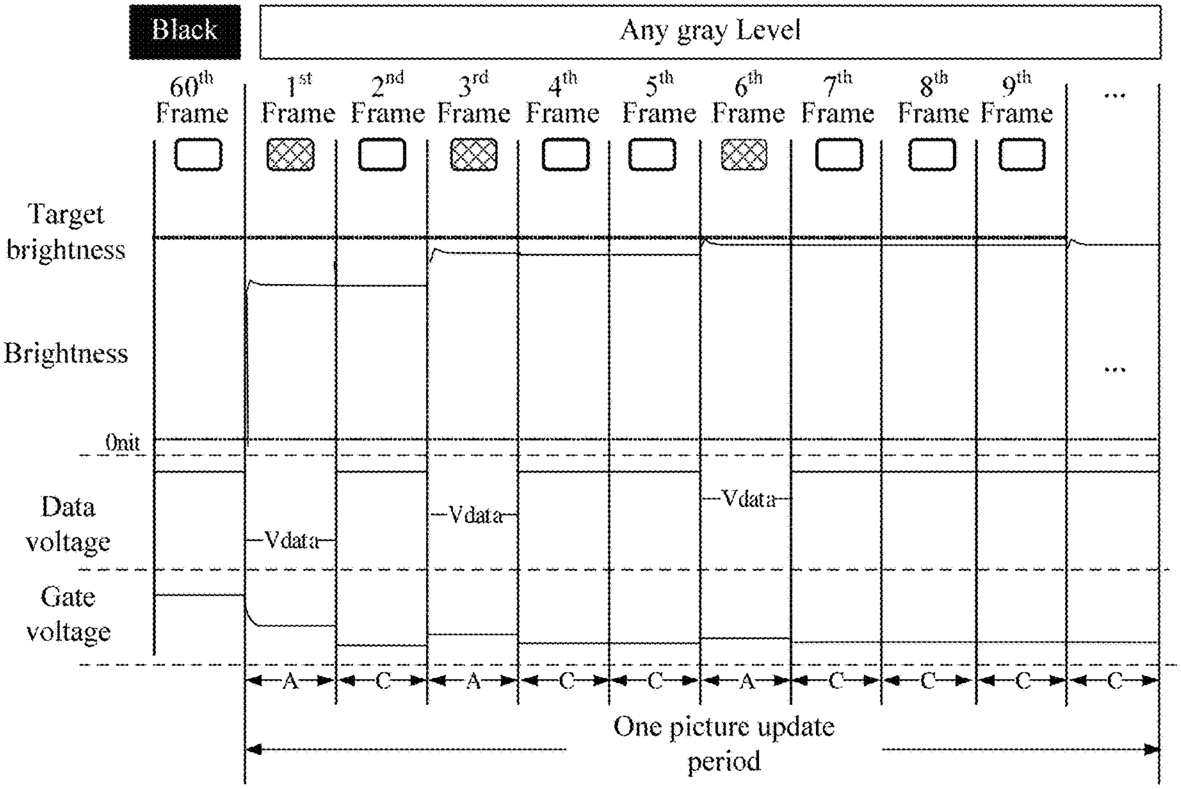
FIG. 10 is a timing diagram of another method for driving a display panel according to an embodiment of the present disclosure.

FIG. 10 is a timing diagram of another method for driving a display panel according to an embodiment of the present disclosure. FIG. 9 and FIG. 10 are compared, and the similarities between this embodiment and the preceding embodiment will not be repeated. In this embodiment, it may also be set that an increasing number of data retention stages C exist between adjacent two data compensation stages A in the same picture update period. In this embodiment, through gradual data compensation and writing, the electrical performance of the drive transistor tends to be stable at the later data compensation stages among the plurality of data compensation stages, and the picture brightness of the display panel approximates to the target brightness at this time. Taking the same picture update period including the plurality of data compensation stages from the first data compensation stage to the Nth data compensation stage as an example, a difference between the actual brightness of the pixel unit at the ath data compensation stage and the target brightness is greater than a difference between the actual brightness of the pixel unit at the (a+1)th data compensation stage and the target brightness. In this embodiment, fewer data retention stages exist between the ath data compensation stage and the (a−1)th data compensation stage, which can prevent the picture whose brightness has a relatively large difference from the target brightness from being retained at too many data retention stages and make more data retention stages configured when the electrical performance of the drive transistor gradually stabilizes, so that the picture brightness of the entire picture update period more approximates to the target display brightness. Moreover, with the compensation at the data compensation stages, the threshold voltage Vth of the drive transistor drifts softly. To cope with this trend, the number of data compensation stages later in the picture update period may be appropriately reduced, the data compensation stages are arranged sparsely, and the data write unit writes data fewer times, thereby reducing the power consumption of the display device.

In addition, as described above, since the brightness of the display panel at the data compensation stage is lower than the target brightness, to ensure that the overall brightness of the entire picture update period more approximates to the target brightness, the positions of the data compensation stage and the data write stage in the entire picture update period may be reasonably set, so that the brightness at the data compensation stage is effectively compensated, and after the target brightness is quickly reached, the picture with the target brightness, achieved at the data write stage, can be retained continuously in the picture update period and has a higher time proportion. Based on this, in the embodiments of the present disclosure, it may be set that the same picture update period includes N data compensation stages, M data retention stages, and P data write stages; where N, M, and P are integers greater than or equal to 1; and M*a %/N data retention stages exist between any adjacent two data compensation stages, where 30%≤a %≤50%, M*a % is an integer greater than or equal to 1, and M*a %/N is an integer greater than or equal to 1.

M*a % is essentially the number of data retention stages before the data write stage. In other words, M*a % data retention stages are divided equally according to the number N of the data compensation stages and then distributed after each data compensation stage. In this case, the data retention stage exists after each data compensation stage, so that the refresh of the compensated brightness at each data compensation stage can be delayed. Meanwhile, the remaining data retention stages may be divided equally among the P data write stages and distributed after each data write stage, so as to delay refreshing the picture of each data write stage.

Of course, merely one data write stage may generally be configured in the same picture update period. Therefore, except the data retention stages configured before the data write stage, the remaining data retention stages may all retain the display of the picture with the target brightness at the one data write stage.

It is to be noted that when a % is small, few data retention stages exist after each data compensation stage, and the compensated brightness cannot be retained. However, when a % is large, the picture with the target brightness at the data write stage is retained for a longer time, and in the entire picture update period, the overall brightness of the picture has a small difference from the retained brightness. It is to be further noted that when a % is large, the overall brightness of the picture has a small difference from the retained brightness, and when too many data retention stages are configured to retain the picture with the target brightness at the data write stage, the drive transistor in the pixel circuit has a certain leakage current which will cause the brightness retained at multiple data retention stages to decrease and thus have a certain difference from the target brightness. Based on the above reasons, the value of a % may be specifically set within a range of 30% to 50%, and the specific value of a % may be weighed and set according to the actual brightness compensation situation and the overall brightness of the entire picture update period.

With this embodiment, the data retention stage is added after the data compensation stage, so that the data retention stage has the compensated brightness with no data voltage being written to the pixel unit, which can save the times the compensation data voltage is written and reduce the power consumption of the display panel. The data compensation stages and the data write stage may be appropriately distributed at early and middle stages of the picture update period to prevent the data voltage from being intensively written at early stages of the picture update period. Moreover, a relatively small number of data retention stages are configured after the data write stage, which can avoid that the picture retained for a long time at the data retention stages is uncontrollable and ensure that the display brightness of the entire picture update period more approximates to the target brightness relatively accurately. In addition, a relatively small number of data retention stages can ensure that the retained picture brightness more approximates to the picture brightness at the data write stage.

Further, the method for driving a display panel provided by the embodiments of the present disclosure further involves the design of the specific structure of the pixel circuit in the display panel. In the display panel, each pixel unit is provided with a respective pixel circuit, that is, the display panel includes a plurality of pixel circuits, each of which corresponds to its respective pixel unit; where the plurality of pixel circuits may be configured to include a first pixel circuit and a second pixel circuit, a drive transistor in the first pixel circuit is a silicon-based transistor, and a drive transistor in the second pixel circuit is an oxide semiconductor transistor; and in the same picture update period, a proportion of data compensation stages of the first pixel circuit is different from a proportion of data compensation stages of the second pixel circuit.

It is understandable that due to different structures, the silicon-based transistor and the oxide semiconductor transistor have different electrical performance and different hysteresis effects. Based on this, in the display driving process, for pixel circuits including different drive transistors, the proportion of data compensation stages needs to be set differently, so that differentiated data compensation can be performed for the pixel circuits including different drive transistors, to ensure that the corresponding pixel units reach the target brightness as soon as possible and the picture brightness of the entire picture update period is more uniform. Generally, relative to the oxide semiconductor transistor, the silicon-based transistor has worse hysteresis characteristics and may be configured with slightly more data compensation stages to perform data compensation, thereby increasing the degree of brightness compensation.

Similarly, different types of transistors made of the same material have significantly different electrical performance and different hysteresis effects. Based on this, in the following cases, the display panel includes the plurality of pixel circuits, each of which corresponds to a respective pixel unit. Each of the plurality of pixel circuits includes a drive transistor, and the drive transistor includes an N-type silicon-based transistor and a P-type silicon-based transistor. The pixel circuit includes a third pixel circuit and a fourth pixel circuit, the third pixel circuit includes the N-type silicon-based transistor, and the fourth pixel circuit includes the P-type silicon-based transistor. It may be set that in the same picture update period, a proportion of data compensation stages of the third pixel circuit is different from a proportion of data compensation stages of the fourth pixel circuit.

In this case, the differentiated data compensation is performed for pixel circuits including different types of drive transistors, which can ensure that the corresponding pixel units reach the target brightness as soon as possible and the picture brightness of the entire picture update period is more uniform.

Further, it may be set that in the same picture update period, the proportion of data compensation stages of the third pixel circuit is X, the proportion of data compensation stages of the fourth pixel circuit is Y, and X≥Y.

Taking a low-temperature polysilicon transistor as an example, the N-type silicon-based transistor has a more significant hysteresis effect and thus may be configured with more data compensation stages when the data compensation stages are configured in the picture update period, thereby improving a brightness compensation effect. The P-type silicon-based transistor has relatively good electrical performance and a relatively insignificant hysteresis effect, and may be configured with fewer data compensation stages in the picture update period.

In another embodiment of the present disclosure, the display panel includes the plurality of pixel circuits, each of which corresponds to its respective pixel unit; where the pixel circuit includes the drive transistor, and the drive transistor includes the N-type silicon-based transistor. For the pixel circuit including the N-type silicon-based transistor, in the picture update period, the number of the data compensation stages, the number of the data retention stages, and the number of the data write stages satisfy that $N/(N+M+P) \leq 1/6$.

In another embodiment of the present disclosure, the display panel includes the plurality of pixel circuits, each of which corresponds to its respective pixel unit; where the pixel circuit includes the drive transistor, and the drive transistor includes the P-type silicon-based transistor. For the pixel circuit including the P-type silicon-based transistor, in the picture update period, the number of the data compensation stages, the number of the data retention stages, and the number of the data write stages satisfy that $N/(N+M+P) \leq 1/12$.

Similarly, the N-type silicon-based transistor has worse electrical performance and the more significant hysteresis effect and thus may be configured with more data compensation stages when the data compensation stages are configured in the picture update period, thereby improving the brightness compensation effect. The P-type silicon-based transistor has the relatively insignificant hysteresis effect and may be configured with fewer data compensation stages in the picture update period. Taking the picture update period of is and the drive frequency of 60 Hz as an example, the picture update period includes 60 frames, the data compensation stages may include 10 frames in the driving process of the pixel circuit including the N-type silicon-based transistor, and the data compensation stages may include 5 frames in the driving process of the pixel circuit including the P-type silicon-based transistor.

According to the types of drive transistors in different pixel circuits, the proportion of data compensation stages is increased or targetedly set for the drive transistor with a more serious hysteresis effect, so that the degree of data compensation at the data compensation stages can be improved, and each pixel unit in the display panel can obtain the corresponding brightness compensation in the same picture update period, there avoiding brightness differences of the pixel units due to different degrees of hysteresis effects and ensuring more accurate brightness of the pixel unit and the brightness uniformity of the display panel.

Further, the degrees of data compensation in different picture update periods are also discussed and designed in the embodiments of the present disclosure. Specifically, any adjacent two picture update periods include a first picture update period and a second picture update period; where the first picture update period includes N1 data compensation stages, M1 data retention stages, and P1 data write stages, and the second picture update period includes N2 data compensation stages, M2 data retention stages, and P2 data write stages. It may be set that the first picture update period and the second picture update period satisfy that $N1+M1+P1<N2+M2+P2$ and $N1<N2$.

$N1+M1+P1$ is the total number of various stages in the first picture update period, $N2+M2+P2$ is the total number of various stages in the second picture update period, and that $N1+M1+P1<N2+M2+P2$ indicates that the total number of various stages in the second picture update period is larger. Apparently, when the first picture update period and the second picture update period include the same number of data compensation stages, the proportion of the data compensation stages in the first picture update period is relatively high in time, and from the perspective of merely the proportion of compensation time, the data compensation degree of the first picture update period is higher than the data compensation degree of the second picture update period. To ensure the same degree of brightness compensation in the picture update periods of the same display panel and obtain more uniform brightness compensation in the picture update periods, the number N2 of the data compensation stages in the second picture update period may be configured to be greater than the number N1 of the data compensation stages in the first picture update period. Further, in the actual picture update process of the display panel, it may be set that the number of the data compensation stages in the first picture update period and the number of the data compensation stages in the second picture update period satisfy that $N1/(N1+M1+P1)=N2/(N2+M2+P2)$.

In an embodiment, $P1=P2=1$.

The inventor has found through further research that pixel units of different colors have different light-emitting efficiency and require different drive currents for the same target brightness in the actual display driving process, which means that different data voltages need to be written. On this basis, in another embodiment of the present disclosure, the display panel includes a first color pixel unit and a second color pixel unit, and under the same target brightness, a theoretical data voltage corresponding to the first color pixel unit is less than a theoretical data voltage corresponding to the second color pixel unit.

In an embodiment, it may be set that a difference between compensation data voltages corresponding to adjacent two data compensation stages of the first color pixel unit is greater than a difference between compensation data voltages corresponding to adjacent two data compensation stages of the second color pixel unit.

Alternatively, a compensation data voltage corresponding to the first color pixel unit at the initial data compensation stage is less than a compensation data voltage corresponding to the second color pixel unit at the initial data compensation stage.

Alternatively, the number of data compensation stages of the first color pixel unit is greater than the number of data compensation stages of the second color pixel unit.

It is understandable that in the display panel, the light-emitting efficiency of the first color pixel unit is lower than that of the second color pixel unit. Exemplarily, the first color pixel unit may be a blue pixel unit, and the second color pixel unit may be a red pixel unit or a green pixel unit. Under the same target brightness, the drive current for the blue pixel unit needs to be greater than the drive current for the red or green pixel unit. Therefore, it is understandable that the blue pixel unit should be provided with a smaller initial compensation data voltage that corresponds to higher theoretical brightness, so that the blue pixel unit can reach the target brightness more quickly.

From another aspect, it is understandable that the current through the blue pixel unit changes relatively sharply, and to quickly stabilize the threshold voltage of the drive transistor for the blue pixel unit, the difference between compensation data voltages for the blue pixel unit may be increased to match the change trend of the current through the blue pixel unit, so that the brightness of the blue pixel unit can be changed quickly and reach the same target brightness in synchronization with other color pixel units. Based on this, in an embodiment, it may be set that the difference between compensation data voltages corresponding to adjacent two data compensation stages of the first color pixel unit decreases faster than the difference between compensation data voltages corresponding to adjacent two data compensation stages of the second color pixel unit, that is, the compensation data voltage for the blue pixel unit changes more sharply.

From another aspect, it is understandable that the data compensation stage is mainly to provide the compensation data voltage lower than the target data voltage, that is, the corresponding theoretical brightness needs to be higher, so as to improve the hysteresis of the threshold voltage of the drive transistor. Therefore, more data compensation stages configured for the blue pixel unit can more significantly improve the hysteresis of the threshold voltage of the drive transistor for the blue pixel unit and more quickly stabilize the threshold voltage of the drive transistor corresponding to the blue pixel unit. In an embodiment, when the total number of stages before the data write stage of the blue pixel unit is equal to the total number of frames before the data write stage of the second color pixel unit, it may be set that the number of data compensation frames of the blue pixel unit is greater than the number of data compensation stages of the second color pixel unit.

In some embodiments of the present application, the similarities with the preceding embodiments will not be repeated and a difference is that to simplify data compensation algorithms of the pixel units of different colors, the compensation data voltages written at the data compensation stages are quantified. In the embodiments of the present disclosure, it is further set that arithmetic sequences are used for quantifying the relationship of the sizes of the compensation data voltages written to the pixel units of different colors at the plurality of data compensation stages. Specifically, it may be set that the compensation data voltages written to the first color pixel unit at the plurality of data compensation stages are in a first arithmetic sequence, and the compensation data voltages written to the second color pixel unit at the plurality of data compensation stages are in a second arithmetic sequence; where the first arithmetic sequence includes N1 terms, with a common difference being d1 and an initial term being a1, and the second arithmetic sequence includes N2 terms, with a common difference being d2 and an initial term being a2. Moreover, it may be set that the first arithmetic sequence and the second arithmetic sequence satisfy that a1=a2, d1=d2, and N1<N2, that a1=a2, d1<d2, and N1=N2, or that a1<a2, d1=d2, and N1=N2.

It is understandable that since the theoretical brightness of the data compensation stage is higher than the target brightness, the compensation data voltage is less than the target data voltage. Therefore, each of the first arithmetic sequence corresponding to the first color pixel unit and the second arithmetic sequence corresponding to the second color pixel unit is essentially an increasing arithmetic sequence. Moreover, since the theoretical data voltage for the first color pixel unit is less than the theoretical data voltage for the second color pixel unit under the same target brightness, a last term of the first arithmetic sequence is smaller than a last term of the second arithmetic sequence.

On this basis, to make the compensation data voltages in the two arithmetic sequences reach the last terms at the same time and ensure the picture brightness uniformity of the display panel, it may be set that the initial terms and the common differences are equal, that is, a1=a2 and d1=d2, and the number of items in the first arithmetic sequence is smaller than the number of items in the second arithmetic sequence, that is, N1<N2. In other words, when other conditions are guaranteed to be identical, it may be set that the number N1 of data compensation stages of the first color pixel unit is smaller than the number N2 of data compensation stages of the second color pixel unit. That is, from the perspective of merely compensation amount, the degree of data compensation for the first color pixel unit is relatively low. Since the target data voltage for the first color pixel unit is lower than the target data voltage for the second color pixel unit, no excessive data compensation needs to be performed for the first color pixel unit, and more data compensation needs to be performed for the second color pixel unit. At this time, the first color pixel unit and the second color pixel unit can synchronously reach the corresponding target data voltages and obtain the same target brightness.

Of course, it may also be set in this embodiment that the initial terms and the numbers of terms are equal, that is, a1=a2, N1=N2, and the common difference of the first arithmetic sequence is smaller than the common difference of the second arithmetic sequence, that is, d1<d2. In other words, when other conditions are guaranteed to be identical, it may be set that the difference d1 between compensation data voltages corresponding to adjacent two data compensation stages of the first color pixel unit is smaller than the difference d2 between compensation data voltages corresponding to adjacent two data compensation stages of the second color pixel unit, that is, the compensation data voltage for the first color pixel unit at the data compensation stages may increase slower. Since the target data voltage for the first color pixel unit is lower than the target data voltage for the second color pixel unit, it can be ensured that the first color pixel unit and the second color pixel unit synchronously reach the corresponding target data voltages and obtain the same target brightness.

Similarly, it may also be set in this embodiment that the common differences and the numbers of terms are equal, that is, d1=d2, N1=N2, and the initial term of the first arithmetic sequence is smaller than the initial term of the second arithmetic sequence, that is, a1<a2. In other words, when other conditions are guaranteed to be identical, it may be set that the compensation data voltage a1 corresponding to the first color pixel unit at the initial data compensation stage is less than the compensation data voltage a2 corresponding to the second color pixel unit at the initial data compensation stage, that is, the first color pixel unit is provided with a smaller initial compensation data voltage at the data compensation stages. Since the target data voltage for the first color pixel unit is less than the target data voltage for the second color pixel unit, the first color pixel unit is provided with the smaller initial compensation data voltage, which can ensure that the first color pixel unit and the second color pixel unit synchronously reach the corresponding target data voltages and obtain the same target brightness.

It is to be noted that the arithmetic sequences are used for quantifying the relationship of the sizes of the compensation data voltages for the pixel units of different colors on the premise that the compensation data voltages are in an arithmetic sequence and particular conditions of the arithmetic sequence are consistent. Only when the particular conditions remain identical, can particular parameters of the arithmetic sequences of the compensation data voltages for the pixel units of different colors be compared in size. It is understandable that in other embodiments of the present disclosure, the compensation data voltages for the pixel units of different colors may satisfy other size relationships, so as to perform adaptive adjustment and compensation for the hysteresis effects of the drive transistors corresponding to the pixel units of different colors and ensure the stability of the drive transistor and display uniformity, which are not excessively described here.

Based on the same concept, the embodiments of the present disclosure further provide a display device. With continued reference to FIG. 2, the display device includes a display panel 100, a scanning drive unit 200, and a data write unit 300. The display panel 100 includes a plurality of pixel units 110 and a plurality of picture update periods, at least one of the plurality of picture update periods includes a data write stage, a data compensation stage, and a data retention stage, and the data compensation stage precedes the data write stage. The scanning drive unit 200 is configured to provide a gate scanning signal for each of the plurality of pixel units at the data write stage and the data compensation stage, separately. The data write unit 300 is configured to provide the gate scanning signal for and write a target data voltage to the pixel unit at the data write stage, where the target data voltage is a theoretical data voltage corresponding to target brightness of a current picture update period. The data write unit 300 is further configured to provide the gate scanning signal for and write a compensation data voltage to the pixel unit at the data compensation stage, where the compensation data voltage is less than the target data voltage.

The display device is not limited to a mobile phone, a tablet, and a wearable product, and may also be a computer, a television, an advertising display, etc., which is not limited here. In a display driving process of the display panel 100, picture updates are generally required to implement a continuous picture display. It may be set that the plurality of picture update periods are included in the display driving process, where a picture with certain brightness is displayed in each picture update period. In the display device in the embodiments of the present disclosure, the data write stage, the data compensation stage, and the data retention stage are configured in at least one picture update period, where the data compensation stage is essentially a process of writing the compensation data voltage to the pixel unit, and after the compensation data voltage is written in this process, the pixel unit is driven to display the picture. However, the brightness of the pixel unit or the display panel is affected by the hysteresis effect of a drive transistor in a pixel circuit, so that the brightness of the pixel unit or the display panel is essentially inconsistent with theoretical brightness corresponding to the compensation data voltage. Those skilled in the art may understand that for an OLED display panel, the brightness of the pixel unit is positively correlated to a current flowing through the drive transistor in the pixel circuit, and the current flowing through the drive transistor is inversely proportional to the data voltage written to the pixel unit. Based on this, in the embodiments of the present disclosure, it is set that the compensation data voltage written at the data compensation stage is less than the target data voltage, and then the brightness of the pixel unit or the display panel will be greater than the target brightness of the current picture update period in theory. Moreover, though the drive transistor in the pixel circuit has the hysteresis effect, the actual brightness of the display panel can be improved after the data voltage is written according to higher picture brightness. In other words, at the data compensation stage, a smaller compensation data voltage is written, so that higher picture brightness can be actually obtained. Moreover, since the higher picture brightness at the compensation stage more approximates to the target brightness, the time to reach the target brightness can be shortened to a certain degree. Therefore, in the picture update period, before the target brightness is reached, a difference between brightness changes is relatively small, brightness buffering time is shortened, the target brightness can be reached faster, and the display effect of the picture is ensured.

The data write stage refers to a process of writing the theoretical data voltage corresponding to the target brightness of the current picture update period to the pixel unit. The data write stage needs to be configured after the data compensation stage, so that through the data compensation process, the electrical performance of the drive transistor in the pixel circuit tends to be stable, and a threshold of the drive transistor reaches a theoretical value. The normal driving of the pixel circuit can be implemented at the data write stage, and the pixel unit or the display panel performs display at the target brightness. The data retention stage is essentially display based on the target data voltage written at the data write stage or display based on the compensation data voltage written at the data compensation stage. Therefore, the data retention stage should be configured after the data write stage or the data compensation stage. The data voltage written at the data write stage or the data compensation stage may be stored in a capacitor of the pixel circuit, and there is no need to rewrite the data voltage at the data retention stage. In a process of refreshing the display of the pixel unit, the pixel unit is turned on and driven by simply providing a light emission control signal, so that the display panel can retain the picture.

The display device provided by the embodiments of the present disclosure is configured to include the display panel, the scanning drive unit, and the data write unit, where the display panel includes the plurality of pixel units and the display driving process of the display panel includes the plurality of picture update periods, at least one of the plurality of picture update periods includes the data write stage, the data compensation stage, and the data retention stage, and the data compensation stage precedes the data write stage; the scanning drive unit is configured to provide the gate scanning signal for each pixel unit at the data write stage and the data compensation stage, separately; the data write unit is configured to provide the gate scanning signal for and write the target data voltage to the pixel unit at the data write stage, where the target data voltage is the theoretical data voltage corresponding to the target brightness of the current picture update period; and the data write unit is further configured to provide the gate scanning signal for and write the compensation data voltage to the pixel unit at the data compensation stage, where the compensation data voltage is less than the target data voltage, so that the display panel implements the data compensation process in at least one picture update period, thereby improving the display brightness of the display panel in the data compensation process. The embodiments of the present disclosure can solve the problem of screen flicker due to the hysteresis effect of the transistor, compensate for the unstable electrical performance of the transistor, ensure that the target brightness of the current picture update period is reached as soon as possible when pictures are switched, and reduce a picture brightness difference in the same picture update period, thereby improving picture display quality and effect.

Figure 11:
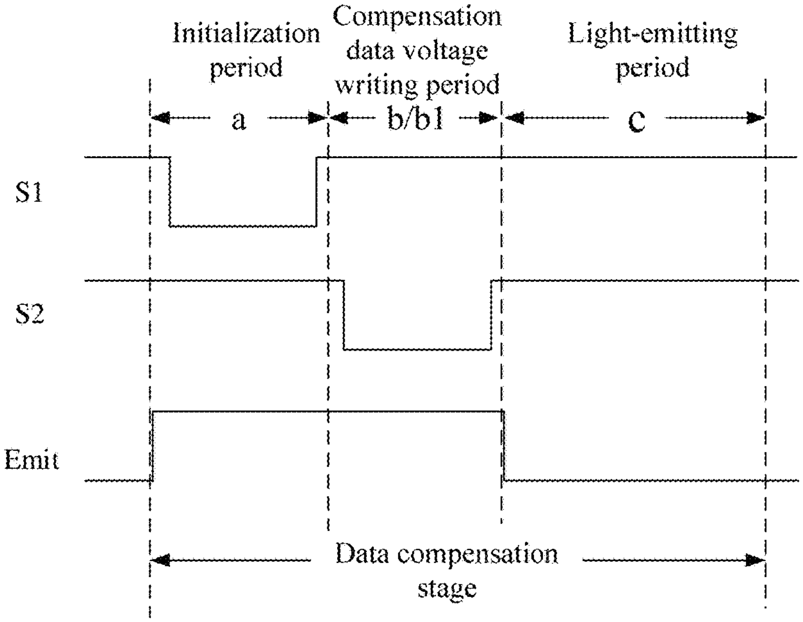
FIG. 11 is a timing diagram of a data compensation stage according to an embodiment of the present disclosure.
Figure 12:
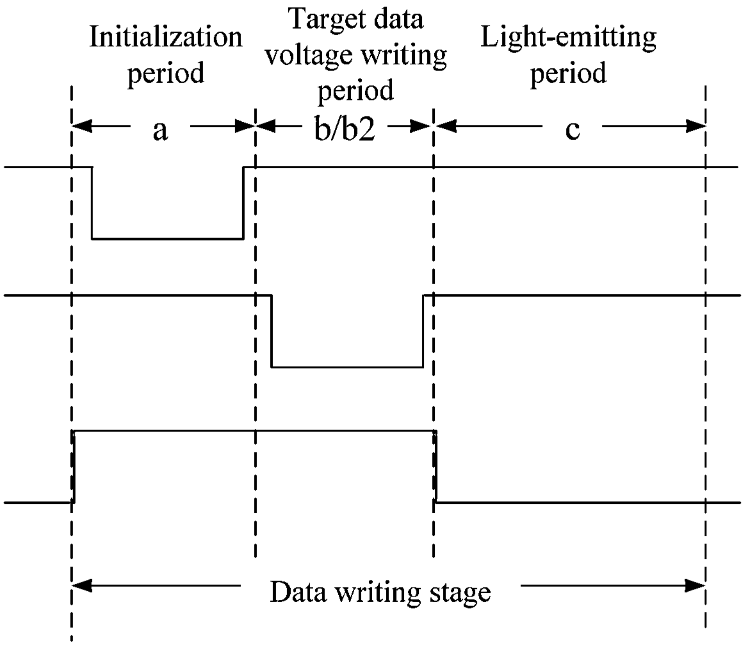
FIG. 12 is a timing diagram of a data write stage according to an embodiment of the present disclosure.
Figure 13:
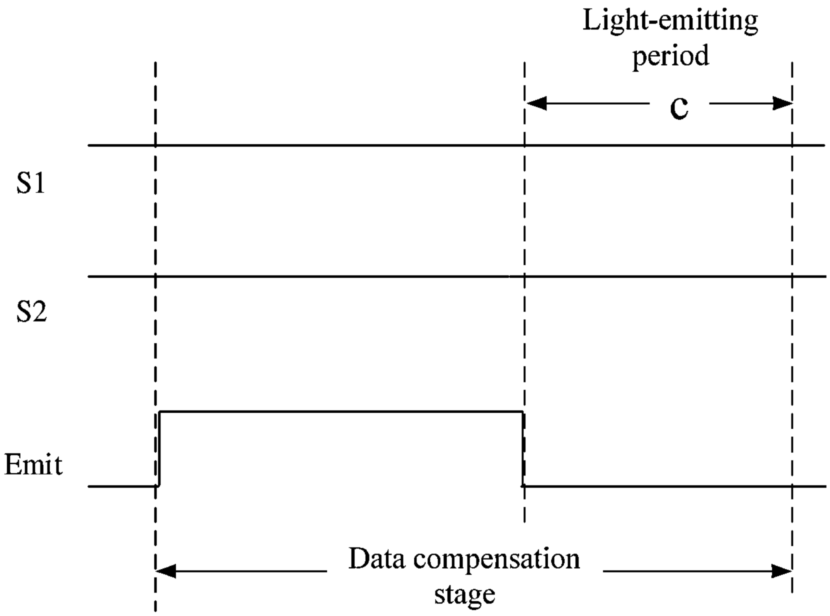
FIG. 13 is a timing diagram of a data retention stage according to an embodiment of the present disclosure.

In the display device as provided above, the display panel includes a plurality of pixel circuits, each of which corresponds to a respective pixel unit. The process of driving the display panel is essentially a driving process of each pixel circuit. The embodiments of the present disclosure further provide various pixel circuits. In the display panel and the method for driving the display panel described above, the specific process for configuring the data compensation stage, the data write stage, and the data retention stage in the same picture update period will be described in detail below. Each of the data compensation stage, the data write stage, and the data retention stage in the same picture update period may in fact be equivalent to a driving process of one frame of picture of the display panel. In the driving process of a corresponding one frame of picture, for each pixel unit and the pixel circuit therefor on the display panel, the driving process of the one frame of picture includes a plurality of drive periods. FIG. 11 is a timing diagram of a data compensation stage according to an embodiment of the present disclosure. FIG. 12 is a timing diagram of a data write stage according to an embodiment of the present disclosure. FIG. 13 is a timing diagram of a data retention stage according to an embodiment of the present disclosure. Referring to FIGS. 11 to 13, specifically, the data compensation stage includes at least a compensation data voltage writing period b1 and a light-emitting period c; the data write stage includes at least a target data voltage writing period b2 and the light-emitting period c; and the data retention stage includes at least the light-emitting period c.

The target data voltage writing period and the light-emitting period are explained by using the data write stage as an example. With continued reference to FIG. 3, the pixel circuit includes a drive transistor T, a data write module 20, a light emission control modules (51 and 52), and a threshold compensation module 30; where a control terminal G of the drive transistor T is electrically connected to a first node N1, a first terminal T1 of the drive transistor is electrically connected to a second node N2, and a second terminal T2 of the drive transistor is electrically connected to a third node N3; the data write module 20 is electrically connected between a data signal terminal Vdata and the second node N2; and the threshold compensation module 30 is electrically connected between the first node N1 and the third node N3. The data write module 20 is configured to provide a data signal inputted from the data signal terminal Vdata for the drive transistor T. The threshold compensation module 30 is configured to compensate the first node N1 with a threshold voltage Vth of the drive transistor T. The light emission control module (51 and 52) and the drive transistor T are electrically connected between a power signal terminal PVDD and a light-emitting element 60, and the light emission control module (51 and 52) is configured to control whether a drive current flows through the light-emitting element 60.

Specifically, the pixel circuit further includes an initialization module 10, a reset module 70, and a storage capacitor Cst. The initialization module 10 is electrically connected between an initialization signal terminal Vref and the first node N1. The initialization module 10 is configured to provide an initialization signal from the initialization signal terminal Vref for the first node N1 at an initialization stage. The reset module 70 is electrically connected between a first scanning signal terminal S1 and an anode of the light-emitting element 60. The reset module 70 is configured to provide a reset signal for the anode of the light-emitting element 60 at a reset stage. A gate G of the drive transistor T and a first plate a of the storage capacitor Cst are electrically connected to the first node N1, and a second plate b of the storage capacitor Cst is electrically connected to the power signal terminal PVDD.

A specific drive timing sequence of the pixel circuit is described below with reference to FIGS. 3 and 12. Details are provided below.

In an initialization period a, the initialization module 10 is on and provides the initialization signal from the initialization signal terminal Vref for the first node N1 to initialize a signal stored in the storage capacitor Cst and the gate G of the drive transistor T. This stage is in fact a process of resetting the storage capacitor Cst and the gate G of the drive transistor T to eliminate a data voltage signal existing in the storage capacitor Cst and the gate G of the drive transistor T when a previous frame of picture is displayed. In this way, each light-emitting element 60 is reset and then driven to emit light in each light emission driving process, thereby ensuring the light emission control uniformity of light-emitting elements 60 and light-emitting brightness uniformity.

In the target data voltage writing period b2, the data write module 20 and the threshold compensation module 30 are both on, and the data voltage signal from the data signal terminal Vdata is written to the first node N1 (that is, the first plate a of the storage capacitor Cst and the gate G of the drive transistor T) through the data write module 20, the drive transistor T, and the threshold compensation module 30 in sequence, so that the gate voltage of the drive transistor T gradually increases until a voltage difference between the gate voltage of the drive transistor T and the first terminal T1 of the drive transistor T is equal to a threshold voltage of the drive transistor T, and then the drive transistor T is off.

The first plate a of the storage capacitor Cst is charged through the data voltage signal from the data signal terminal Vdata via the drive transistor T under the control of the data write module 20, so as to ensure that the first node N1 reaches a preset potential value subjected to threshold compensation. At this time, the voltage at the first node N1 is $V1=Vd-|Vth|$, where Vd is a data voltage at the data signal terminal and Vth is the threshold voltage of the drive transistor.

In the light-emitting period c, the light emission control module (51 and 52) is on, the drive current generated by the drive transistor T flows into the light-emitting element 60, and the light-emitting element 60 emits light in response to the drive current.

The light emission control module may include a first light emission control module 51 and a second light emission control module 52, the first light emission control module 51 is electrically connected between the power signal terminal and the first terminal T1 of the drive transistor T, and the second light emission control module 52 is electrically connected between the second terminal T2 of the drive transistor T and a first terminal of the light-emitting element 60; and a second terminal of the light-emitting element 60 may be electrically connected to a low-level signal terminal PVEE, so that when the first light emission control module 51 and the second light emission control module 52 are on in the light-emitting period, a current loop is formed and the light-emitting element 60 is driven to emit light.

It is to be noted that the specific structures of the initialization module, the data write module, the threshold compensation module, and the light emission control module are not limited in the embodiments of the present disclosure, and the modules of the pixel circuit may be designed according to actual needs on the premise that a compensation function for the threshold voltage of the drive transistor can be implemented. For ease of understanding, the specific structures of the initialization module, the data write module, the threshold compensation module, and the light emission control module in the embodiments of the present disclosure are illustrated below. The initialization module 10 may be configured to include a first transistor M1, where a gate of the first transistor M1 is electrically connected to the first scanning signal terminal S1. In the initialization period a, a first scanning signal controls the first transistor M1 to turn on. At this time, the initialization signal terminal Vref performs potential initialization on the first node N1 through the first transistor M1. In a non-initialization period, the first scanning signal controls the first transistor M1 to turn off. The data write module 20 includes a second transistor M2 and the threshold compensation module 30 includes a third transistor M3, where a gate of the second transistor M2 and a gate of the third transistor M3 are electrically connected to a second scanning signal terminal S2. In the target data voltage writing period b2, a second scanning signal S2 controls the second transistor M2 and the third transistor M3 to turn on. At this time, the data signal terminal Vdata writes a data voltage signal subjected to threshold compensation to the first node N1 through the second transistor M2, the drive transistor T, and the threshold compensation module 30. In a non-data write period, the second scanning signal S2 controls the second transistor M2 and the third transistor M3 to turn off. Of the light emission control modules, the first light emission control module 51 may be configured to include a fourth transistor M4 and the second light emission control module 52 may be configured to include a fifth transistor M5, where a gate of the fourth transistor M4 and a gate of the fifth transistor M5 are electrically connected to a light emission control signal terminal Emit. In the light-emitting period, the light emission control signal controls the fourth transistor M4 and the fifth transistor M5 to turn on. At this time, the power signal terminal PVDD, the fourth transistor M4, the drive transistor T, the fifth transistor M5, and the light-emitting element 60 form a conductive channel, and the drive transistor T generates the drive current to drive the light-emitting element 60 to emit light. In a non-light-emitting period, the light emission control signal controls the fourth transistor M4 and the fifth transistor M5 to turn off. It is to be noted that the transistors in the modules and the drive transistor may each be an N-type transistor or a P-type transistor, which is not limited in the embodiments of the present disclosure.

The preceding pixel circuit is essentially a 7T1C pixel circuit and its driving process essentially includes the initialization period a, a data write period b, and the light-emitting period c. It is understandable that the value of the data voltage inputted from the data signal terminal may be changed to achieve on-off in each period of the data write stage, the data compensation stage, and the data retention stage in the embodiments of the present disclosure. Specifically, referring to FIGS. 11 and 12, a data signal is adjusted to change from the target data voltage to the compensation data voltage and then the data write period b can be adjusted to the compensation data voltage writing period b1 at the data compensation stage. Referring to FIG. 13, through the control of related control signals, the initialization module 10, the data write module 20, and the threshold compensation module 30 may all turn off and the light emission control module (51 and 52) turns on, so that at the data retention stage, the initialization period a and the data write period b are closed and the light-emitting element 60 is driven to emit light under the control of the light emission control signal Emit to enter the light-emitting period c.

It is to be noted that in the embodiments of the present disclosure, the initialization module 10 may be configured to initialize a gate potential of the drive transistor T or not to initialize the gate potential of the drive transistor T at the data retention stage, so that the gate of the drive transistor T retains the data voltage stored at the previous stage such as the data write stage and the light-emitting element 60 is driven to emit light with the data voltage.

The embodiments of the present disclosure provide another implementation for the pixel circuit in the display panel. Another pixel circuit provided by the embodiments of the present disclosure further includes a bias adjustment module. The drive transistor in the pixel circuit has a threshold drift which affects the comprehensive characteristics of the drive transistor and further affects the display uniformity of the pixel circuit. In view of this, the bias adjustment module added in the embodiments of the present disclosure may bias the drive transistor to reduce the threshold drift, restore the threshold to a normal level, and ensure the normal driving of the pixel circuit, so that the pixel unit and the display panel can perform display at the target brightness to ensure a display quality. Specifically, the pixel circuit includes the drive transistor, the data write module, the light emission control module, the threshold compensation module, and the bias adjustment module.

A control terminal of the drive transistor is electrically connected to the first node, the first terminal of the drive transistor is electrically connected to the second node, and the second terminal of the drive transistor is electrically connected to the third node. The data write module is electrically connected between the data signal terminal and the second node and configured to provide the data signal inputted from the data signal terminal for the drive transistor. The light emission control module and the drive transistor are electrically connected between the power signal terminal and the light-emitting element, and the light emission control module is configured to control whether the drive current flows through the light-emitting element.

The threshold compensation module is electrically connected between the first node and the third node and configured to detect and self-compensate for a deviation of the threshold voltage of the drive transistor. The bias adjustment module is electrically connected between a bias adjustment signal terminal and the second node or between the bias adjustment signal terminal and the third node. A control terminal of the bias adjustment module is electrically connected to a first control signal terminal. The bias adjustment module and the data write module are respectively electrically connected to different terminals of the first terminal or the second terminal of the drive transistor. The bias adjustment module is configured to control a voltage bias of the drive transistor under the control of a first control signal inputted from the first control signal terminal and a threshold bias adjustment signal inputted from the bias adjustment signal terminal.

Further, the pixel circuit further includes the initialization module electrically connected between the initialization signal terminal and the first node. The initialization module is configured to provide the first node with the initialization signal inputted from the initialization signal terminal.

It is understandable that in the embodiments of the present disclosure, the pixel circuit is provided with the bias adjustment module and the data compensation stage is configured in the picture update period, so that a bias signal provided by the bias adjustment module may be used for making the drive transistor reversely conductive, which can reduce the threshold voltage drift of the drive transistor during forward conduction, make the threshold voltage of the drive transistor more stable, and ensure the drive accuracy of the drive transistor; meanwhile, the data compensation stage is used for increasing the theoretical brightness of the pixel unit, which can ensure that the target brightness of the current picture update period is reached as soon as possible when pictures are switched and enable the pixel circuit to more accurately drive the display brightness of the light-emitting element. That is, the embodiments of the present disclosure can avoid brightness distortion caused by the hysteresis effect and threshold shift of the drive transistor, ensure the accuracy and uniformity of picture display of the display panel, and improve a picture display effect. In addition, in this embodiment, a period in which the bias adjustment module operates is configured in the data compensation stage, which can assist in the data compensation stage and avoid an effect of a different compensation data voltage on the drive transistor especially when the picture update period includes multiple data compensation stages at which different compensation data voltages are provided.

Figure 14:
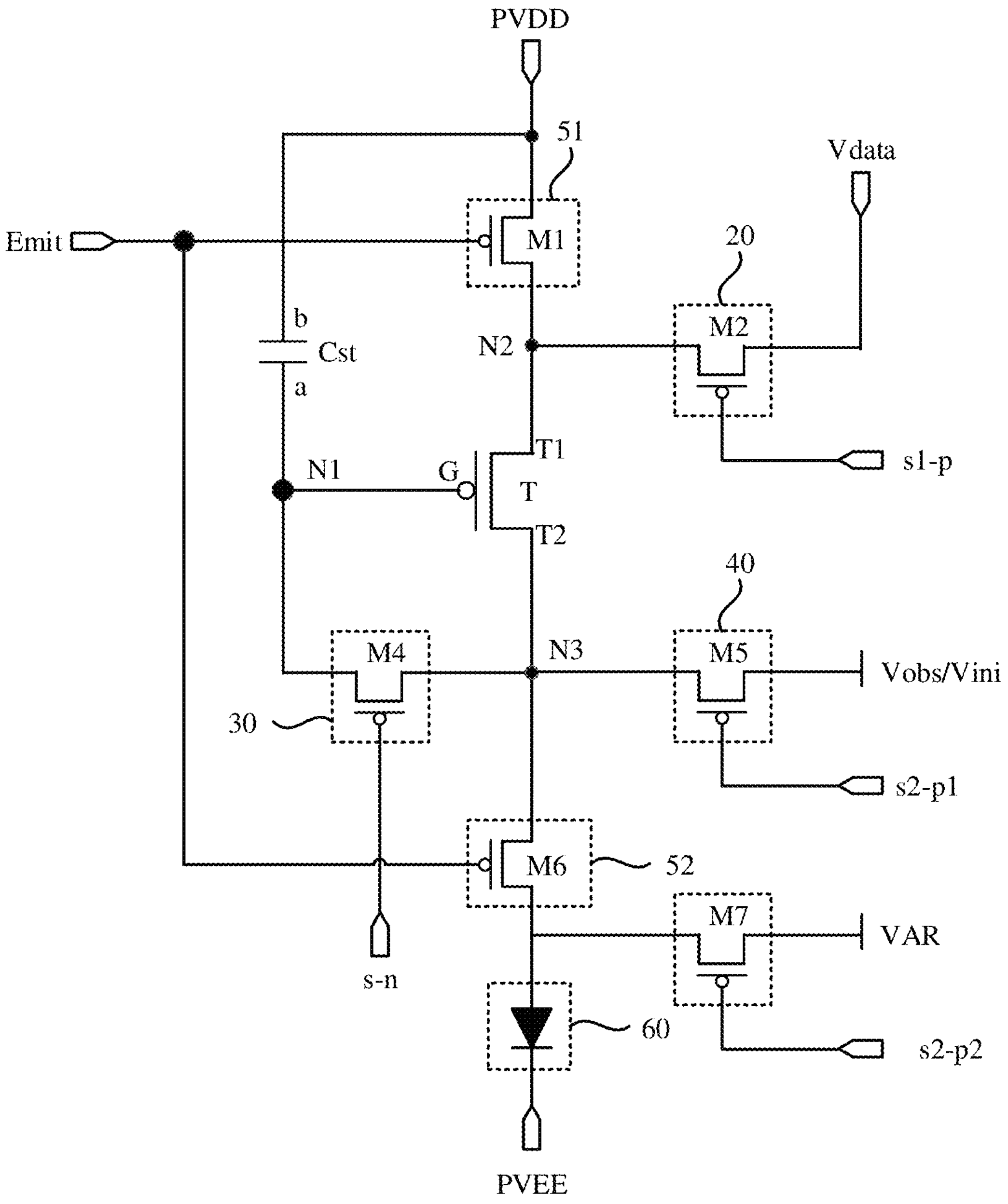
FIG. 14 is a structural diagram of a pixel circuit in a display panel according to an embodiment of the present disclosure.
Figure 15:
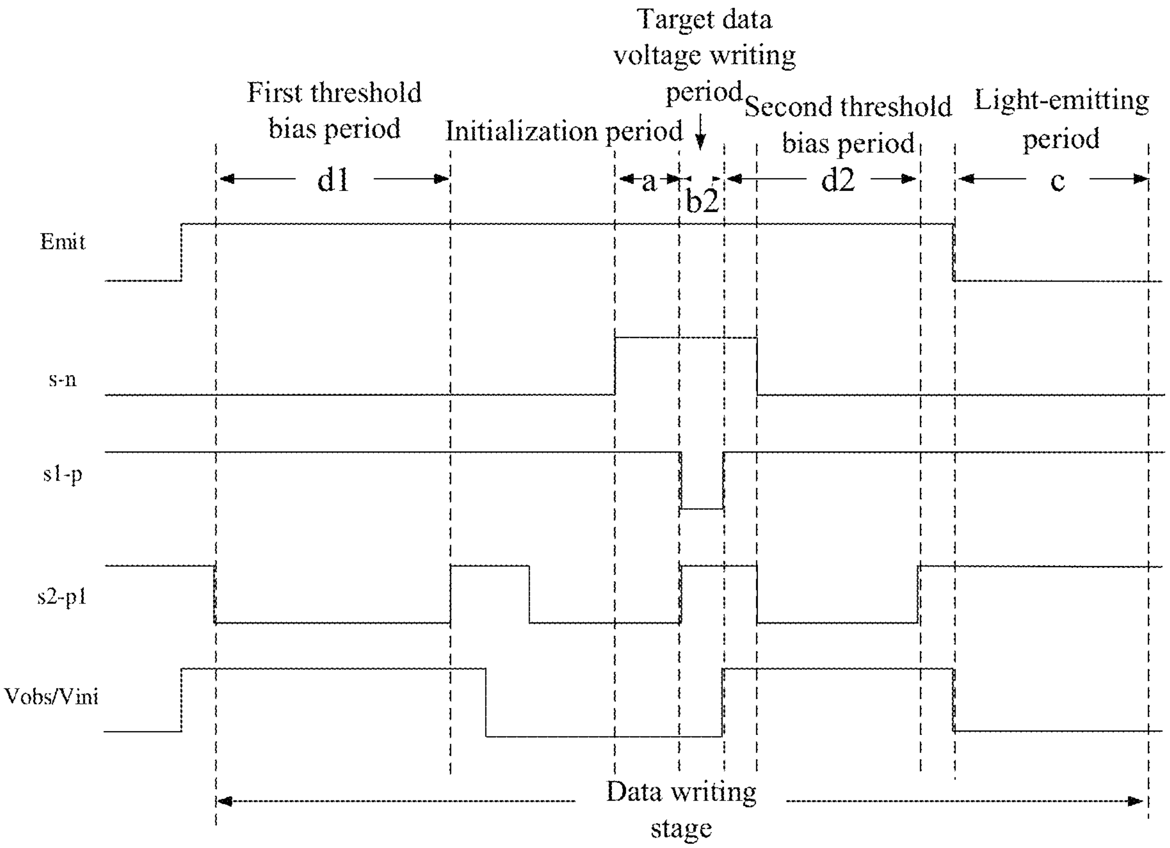
FIG. 15 is a timing diagram of another data write stage according to an embodiment of the present disclosure.

Several pixel circuits including the bias adjustment module, provided by the embodiments of the present disclosure, are described in detail below. FIG. 14 is a structural diagram of a pixel circuit in a display panel according to an embodiment of the present disclosure. FIG. 15 is a timing diagram of another data write stage according to an embodiment of the present disclosure. Referring to FIG. 14, the pixel circuit includes the drive transistor T, the data write module 20, the light emission control module (51 and 52), the threshold compensation module 30, and the bias adjustment module 40; where the control terminal G of the drive transistor T is electrically connected to the first node N1, the first terminal T1 of the drive transistor T is electrically connected to the second node N2, and the second terminal T2 of the drive transistor T is electrically connected to the third node N3; the data write module 20 is electrically connected between the data signal terminal Vdata and the second node N2 and configured to provide the data signal inputted from the data signal terminal Vdata for the drive transistor T.

The light emission control module (51 and 52) and the drive transistor T are electrically connected between the power signal terminal PVDD and the light-emitting element 60. The light emission control module (51 and 52) is configured to control whether the drive current flows through the light-emitting element 60. The threshold compensation module 30 is electrically connected between the first node N1 and the third node N3 and configured to detect and self-compensate for the deviation of the threshold voltage Vth of the drive transistor T.

The bias adjustment module 40 is electrically connected between the bias adjustment signal terminal Vobs and the third node N3. The control terminal of the bias adjustment module 40 is electrically connected to the first control signal terminal s1-*p*. The bias adjustment module 40 is configured to control the voltage bias of the drive transistor T under the control of the first control signal inputted from the first control signal terminal s1-*p* and the threshold bias adjustment signal inputted from the bias adjustment signal terminal Vobs.

In an embodiment, to simplify the structure of the pixel circuit shown in FIG. 14 and improve an area utilization rate of an array substrate in the display panel, it may be set that the drive transistor T is the P-type transistor; and the threshold compensation module 30 and the bias adjustment module 40 are reused as the initialization module for resetting the first node N1.

For the preceding pixel circuit, each of the data write stage and the data compensation stage further includes a first threshold bias period and/or a second threshold bias period. At the data write stage, the first threshold bias period precedes the target data voltage writing period, and the second threshold bias period is between the target data voltage writing period and the light-emitting period. At the data compensation stage, the first threshold bias period precedes the compensation data voltage writing period, and the second threshold bias period is between the compensation data voltage writing period and the light-emitting period.

A specific drive timing sequence is described below by still using the data write stage as an example. Referring to FIG. 15, details are provided below.

In the first threshold bias period d1, the bias adjustment module 40 turns on and the bias adjustment signal terminal Vobs inputs the threshold bias adjustment signal Vobs to the third node N3. The signal value of Vobs to the third node N3 is reasonably set according to Vdata+Vth retained by the first node N1 in the previous frame, such that Vdata+Vth<Vobs, that is, the drive transistor T turns on and the signal Vobs is written to the second node N2, so that the potential at the second node N2 is lower than that at the first node N1. In another case, it is understandable that the drive transistor T is essentially a capacitor and the threshold bias adjustment signal Vobs is written to the third node N3 so as to adaptively adjust the potential at the second node N2 to be lower than the potential at the first node N1. For the drive transistor, the voltage at the second node N2 is lower than the voltage at the first node N1, so that the drive transistor T is reversely conductive, that is, a reverse bias is achieved. At this time, the threshold voltage drift of the drive transistor T weakens, so that normal light emission in the subsequent light-emitting period can be ensured.

In the initialization period a, the threshold compensation module 30 and the bias adjustment module 40 are reused as the initialization module. At this time, the threshold compensation module 30 and the bias adjustment module 40 are both on, and the bias adjustment signal terminal Vobs is reused as the initialization signal terminal Vini to write the initialization signal to the first node N1, where Vobs/Vini is a low-level signal.

In the target data voltage writing period b2, the data write module 20 and the threshold compensation module 30 are both on, and the data voltage signal from the data signal terminal Vdata is written to the first node N1 (that is, the first plate a of the storage capacitor Cst and the gate G of the drive transistor T) through the data write module 20, the drive transistor T, and the threshold compensation module 30 in sequence, so that the gate voltage of the drive transistor T gradually increases until a voltage difference between the gate voltage of the drive transistor T and the first terminal T1 of the drive transistor T is equal to the threshold voltage of the drive transistor T, and then the drive transistor T is off.

Similarly, in the second threshold bias period d2, the bias adjustment module 40 turns on and the bias adjustment signal terminal Vobs inputs the threshold bias adjustment signal Vobs to the third node N3. The signal value of Vobs is reasonably set, such that the voltage at the third node N3 is greater than the voltage at the first node N1; therefore, the drive transistor T turns on and the signal Vobs is written to the second node N2, so that the potential at the second node N2 is lower than that at the first node N1. In another case, it is understandable that the drive transistor T is essentially the capacitor and the threshold bias adjustment signal Vobs is written to the third node N3 so as to adaptively adjust the potential at the second node N2 to be lower than the potential at the first node N1. For the drive transistor, the potential at the second node N2 is lower than the potential at the first node N1, so that the drive transistor T is reversely conductive, that is, the reverse bias is achieved. Therefore, the threshold voltage drift of the drive transistor T weakens, so that normal light emission in the subsequent light-emitting period can be ensured.

In the light-emitting period c, the light emission control module (51 and 52) is on, the drive current generated by the drive transistor T flows into the light-emitting element 60, and the light-emitting element 60 emits light in response to the drive current.

It is to be noted that the specific structures of the initialization module, the data write module, the threshold compensation module, and the light emission control module are not limited in the embodiments of the present disclosure, and the modules of the pixel circuit may be designed according to actual needs on the premise that the compensation function for the threshold voltage of the drive transistor can be implemented. For ease of understanding, the specific structures of the initialization module, the data write module, the threshold compensation module, the bias adjustment module, and the light emission control module in the embodiments of the present disclosure are illustrated below. The bias adjustment module 40 may be configured to include a fifth transistor M5, where a gate of the fifth transistor M5 is electrically connected to a second scanning signal terminal s2-p1. In the first threshold bias period d1 and the second threshold bias period d2, the second scanning signal terminal s2-p1 controls the bias adjustment module 40 to turn on. At this time, the threshold bias adjustment signal Vobs is inputted to the third node N3 and make the potential at the first node N1 lower than the potential at the third node N3, thereby achieving reverse conduction of the drive transistor T. The threshold compensation module 30 and the bias adjustment module 40 are reused as the initialization module. The threshold compensation module 30 may be configured to be a fourth transistor M4 and specifically the N-type transistor. A gate of the fourth transistor M4 is electrically connected to a third scanning signal terminal s-n. In the initialization period a, the second scanning signal terminal s2-p1 and the third scanning signal terminal s-n control the bias adjustment module 40 and the threshold compensation module 30 to turn on, respectively, so as to write the low-level initialization signal Vini to the first node N1. The data write module 20 includes a second transistor M2, where a gate of the second transistor M2 is electrically connected to a first scanning signal terminal s1-*p*. In the target data voltage writing period b2, a first scanning signal s1-*p* controls the second transistor M2 to turn on and a third scanning signal s-n controls the fourth transistor M4 to turn on. At this time, the data signal terminal Vdata writes a data voltage signal subjected to threshold compensation to the first node N1 through the second transistor M2, the drive transistor T, and the threshold compensation module 30. The light emission control module may include a first transistor M1 and a sixth transistor M6, where a gate of the first transistor M1 and a gate of the sixth transistor M6 are electrically connected to the light emission control signal terminal Emit. In the light-emitting period c, the light emission control signal Emit controls the first transistor M1 and the sixth transistor M6 to turn on. At this time, the power signal terminal PVDD, the first transistor M1, the drive transistor T, the sixth transistor M6, and the light-emitting element 60 form a conductive channel, and the drive transistor T generates the drive current to drive the light-emitting element 60 to emit light.

Similarly, the driving process of the pixel circuit in FIG. 14 essentially includes the initialization period a, the data write period b, and the light-emitting period c. It is understandable that for the data write stage, the data compensation stage, and the data retention stage in the embodiments of the present disclosure, the value of the data voltage inputted from the data signal terminal may be changed to adjust the data write period b to the compensation data voltage writing period b1 at the data compensation stage. Meanwhile, through the control of related control signals, the data write module 20 and the threshold compensation module 30 may both turn off and the light emission control module (51 and 52) turns on, so that at the data retention stage, the initialization period a and the data write period b are closed and the picture display is performed in the light-emitting period c at the entire data retention stage. In addition, the first threshold bias period d1 and the second threshold bias period d2 may be configured in the data write stage, and the first threshold bias period d1 and the second threshold bias period d2 may also be configured in the data compensation stage, which is not limited here.

Figure 16:
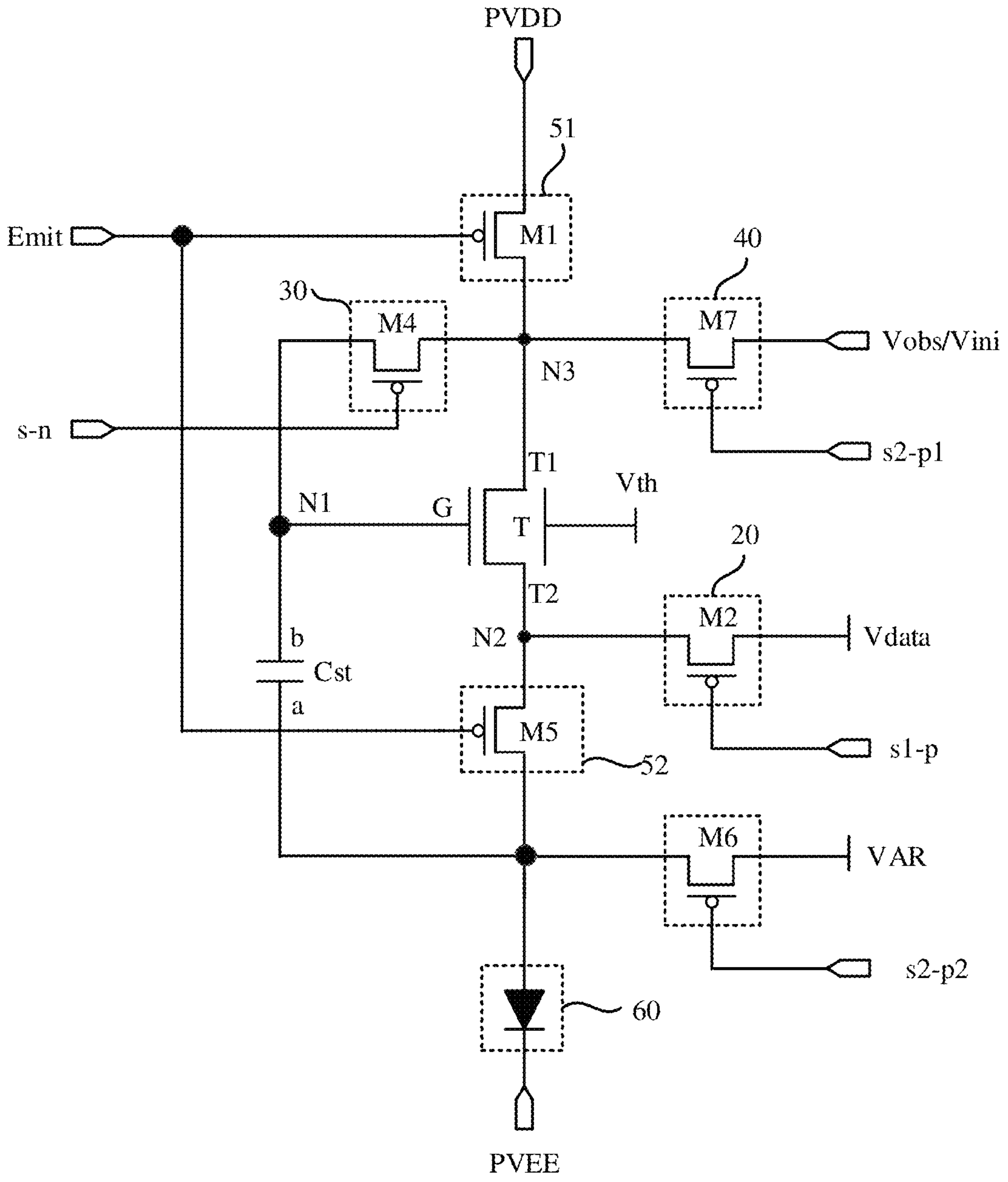
FIG. 16 is a structural diagram of a pixel circuit in a display panel according to an embodiment of the present disclosure.
Figure 17:
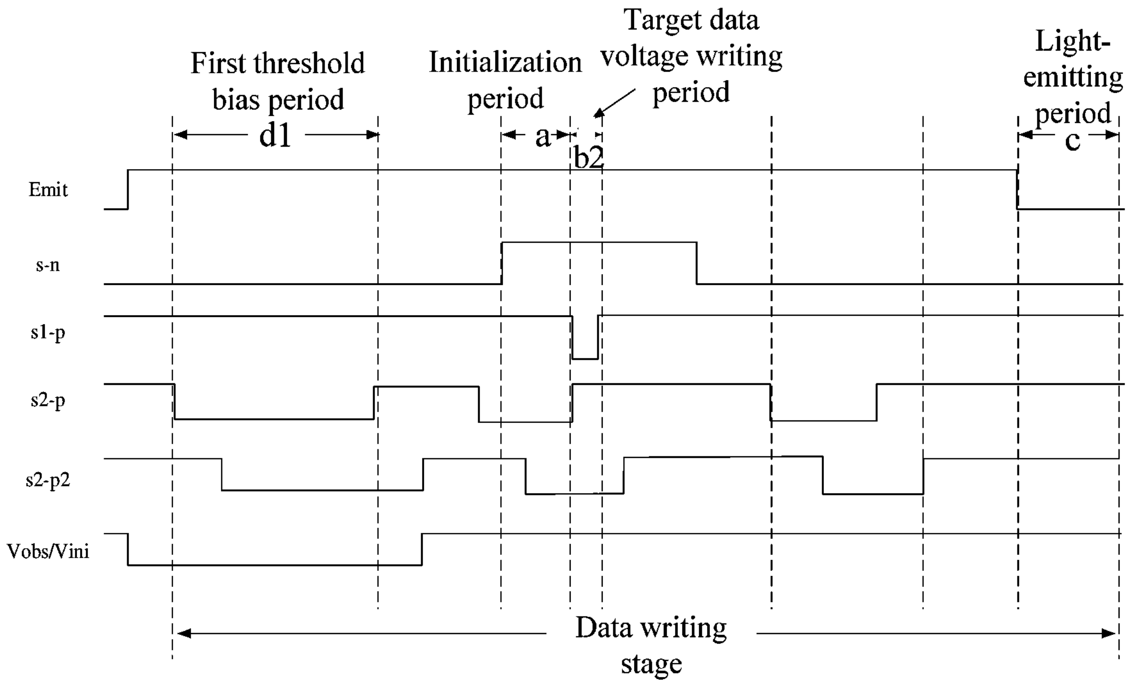
FIG. 17 is a timing diagram of another data write stage according to an embodiment of the present disclosure.

FIG. 16 is a structural diagram of a pixel circuit in a display panel according to an embodiment of the present disclosure. FIG. 17 is a timing diagram of another data write stage according to an embodiment of the present disclosure. Referring to FIG. 16, the pixel circuit includes the drive transistor T, the data write module 20, the light emission control module (51 and 52), the threshold compensation module 30, and the bias adjustment module 40; where the control terminal G of the drive transistor T is electrically connected to the first node N1, the first terminal T1 of the drive transistor T is electrically connected to the second node N2, and the second terminal T2 of the drive transistor T is electrically connected to the third node N3; the data write module 20 is electrically connected between the data signal terminal Vdata and the second node N2 and configured to provide the data signal inputted from the data signal terminal Vdata for the drive transistor T.

The light emission control module (51 and 52) and the drive transistor T are electrically connected between the power signal terminal PVDD and the light-emitting element 60. The light emission control module (51 and 52) is configured to control whether the drive current flows through the light-emitting element 60. The threshold compensation module 30 is electrically connected between the first node N1 and the third node N3 and configured to detect and self-compensate for the deviation of the threshold voltage Vth of the drive transistor T.

The bias adjustment module 40 is electrically connected between the bias adjustment signal terminal Vobs and the third node N3. The control terminal of the bias adjustment module 40 is electrically connected to a second control signal terminal s2-p1. The bias adjustment module 40 is configured to control the voltage bias of the drive transistor T under the control of a second control signal inputted from the second control signal terminal s2-p1 and the threshold bias adjustment signal inputted from the bias adjustment signal terminal Vobs.

In an embodiment, the drive transistor T may be configured to be the N-type transistor; and the threshold compensation module 30 and the bias adjustment module 40 are reused as the initialization module for resetting the first node N1.

In addition, an NMOS drive transistor may be configured to be a double-gate transistor. The double-gate transistor includes a first gate and a second gate, where the first gate is the control terminal of the drive transistor for inputting the data signal and the second gate is electrically connected to a threshold voltage feedback unit. Specifically, the first gate may be a bottom gate of the double-gate transistor and the second gate may be a top gate of the double-gate transistor. The use of a multi-gate structure can reduce an off current of the drive transistor and increase a withstand voltage of the transistor to improve reliability. Alternatively, even if a drain-source voltage fluctuates when the transistor operates in a saturated region, a drain-source current fluctuates little, so that the drive transistor can obtain a flat property. In addition, the second gate is electrically connected to the threshold voltage feedback unit and the threshold voltage feedback unit provides threshold voltage feedback information, so that the working state of the drive transistor can be adjusted and the threshold voltage drift of the drive transistor due to aging can be compensated for. Meanwhile, the threshold voltage feedback unit may also compensate for a mobility difference of the drive transistor to solve the problem ofuneven light-emitting brightness of the light-emitting element due to the threshold voltage drift and the mobility difference of the drive transistor and further improve the uniformity of the display panel.

For the pixel circuit in FIG. 16, each of the data write stage and the data compensation stage may also be configured to include the first threshold bias period and/or the second threshold bias period. At the data write stage, the first threshold bias period precedes the target data voltage writing period, and the second threshold bias period is between the target data voltage writing period and the light-emitting period. At the data compensation stage, the first threshold bias period precedes the compensation data voltage writing period, and the second threshold bias period is between the compensation data voltage writing period and the light-emitting period.

A specific drive timing sequence is described below by still using the data write stage as an example. Referring to FIG. 17, details are provided below.

In the first threshold bias period d1, the bias adjustment module 40 turns on and the bias adjustment signal terminal Vobs inputs the threshold bias adjustment signal Vobs to the third node N3. The signal value of Vobs is reasonably set, such that the voltage at the third node N3 is lower than the voltage at the first node N1; therefore, the drive transistor T is reversely conductive, that is, the reverse bias is achieved. It is to be noted that in the light-emitting period of the previous frame, the storage capacitor Cst stores the signal Vdata, the potential at the first node N1 is Vdata+Vth, and a reason setting is performed such that Vobs<Vdata+Vth, thereby achieving the reverse conduction of the drive transistor. At this time, the threshold voltage drift of the drive transistor T weakens, so that the normal light emission in the subsequent light-emitting period can be ensured.

In the initialization period a, the threshold compensation module 30 and the bias adjustment module 40 are reused as the initialization module. At this time, the threshold compensation module 30 and the bias adjustment module 40 both turn on, and the bias adjustment signal terminal Vobs is reused as the initialization signal terminal Vini to write the initialization signal to the first node N1, where Vobs/Vini is a high-level signal.

In the target data voltage writing period b2, the data write module 20 and the threshold compensation module 30 are both on, and the data voltage signal from the data signal terminal Vdata is written to the first node N1 (that is, the first plate a of the storage capacitor Cst and the gate G of the drive transistor T) through the data write module 20, the drive transistor T, and the threshold compensation module 30 in sequence, so that the gate voltage of the drive transistor T gradually increases until a voltage difference between the gate voltage of the drive transistor T and the first terminal T1 of the drive transistor T is equal to the threshold voltage of the drive transistor T, and then the drive transistor T is off.

In the light-emitting period c, the light emission control module (51 and 52) is on, the drive current generated by the drive transistor T flows into the light-emitting element 60, and the light-emitting element 60 emits light in response to the drive current.

For ease of understanding, similarly, the specific structures of the initialization module, the data write module, the threshold compensation module, and the light emission control module in the pixel circuit in FIG. 16 are illustrated here. The bias adjustment module 40 may be configured to include a seventh transistor M7, where a gate of the seventh transistor M7 is electrically connected to the second scanning signal terminal s2-p1. In the first threshold bias period d1, the second scanning signal terminal s2-p1 controls the bias adjustment module 40 to turn on. At this time, the threshold bias adjustment signal Vobs is inputted to the third node N3, thereby achieving the reverse conduction of the drive transistor T. The threshold compensation module 30 and the bias adjustment module 40 are reused as the initialization module. The threshold compensation module 30 may be configured to be a fourth transistor M4 and specifically the N-type transistor. A gate of the fourth transistor M4 is electrically connected to the third scanning signal terminal s-n. In the initialization period a, the second scanning signal terminal s2-p1 and the third scanning signal terminal s-n control the bias adjustment module 40 and the threshold compensation module 30 to turn on, respectively, so as to write the high-level initialization signal Vini to the first node N1. The data write module 20 includes a second transistor M2, where a gate of the second transistor M2 is electrically connected to a first scanning signal terminal s1-*p*. In the target data voltage writing period b2, the first scanning signal s1-*p* controls the second transistor M2 to turn on and the third scanning signal s-n controls the fourth transistor M4 to turn on. At this time, the data signal terminal Vdata writes a data voltage signal subjected to threshold compensation to the first node N1 through the second transistor M2, the drive transistor T, and the threshold compensation module 30. The light emission control module may include a first transistor M1 and a fifth transistor M5, where a gate of the first transistor M1 and a gate of the fifth transistor M5 are electrically connected to the light emission control signal terminal Emit. In the light-emitting period c, the light emission control signal Emit controls the first transistor M1 and the fifth transistor M5 to turn on. At this time, the power signal terminal PVDD, the first transistor M1, the drive transistor T, the fifth transistor M5, and the light-emitting element 60 form a conductive channel, and the drive transistor T generates the drive current to drive the light-emitting element 60 to emit light.

Similarly, the driving process of the pixel circuit in FIG. 16 essentially includes the initialization period a, the data write period b, and the light-emitting period c. It is understandable that for the data write stage, the data compensation stage, and the data retention stage in the embodiments of the present disclosure, the value of the data voltage inputted from the data signal terminal may be changed to adjust the data write period b to the compensation data voltage writing period b1 at the data compensation stage. Meanwhile, through the control of related control signals, the data write module 20 and the threshold compensation module 30 may both turn off and the light emission control module (51 and 52) turns on, so that at the data retention stage, the initialization period a and the data write period b are closed and the picture display is performed in the light-emitting period c at the entire data retention stage. In addition, the first threshold bias period d1 and the second threshold bias period d2 may be configured in the data write stage, and the first threshold bias period d1 and the second threshold bias period d2 may also be configured in the data compensation stage, which is not limited here.

Figure 18:
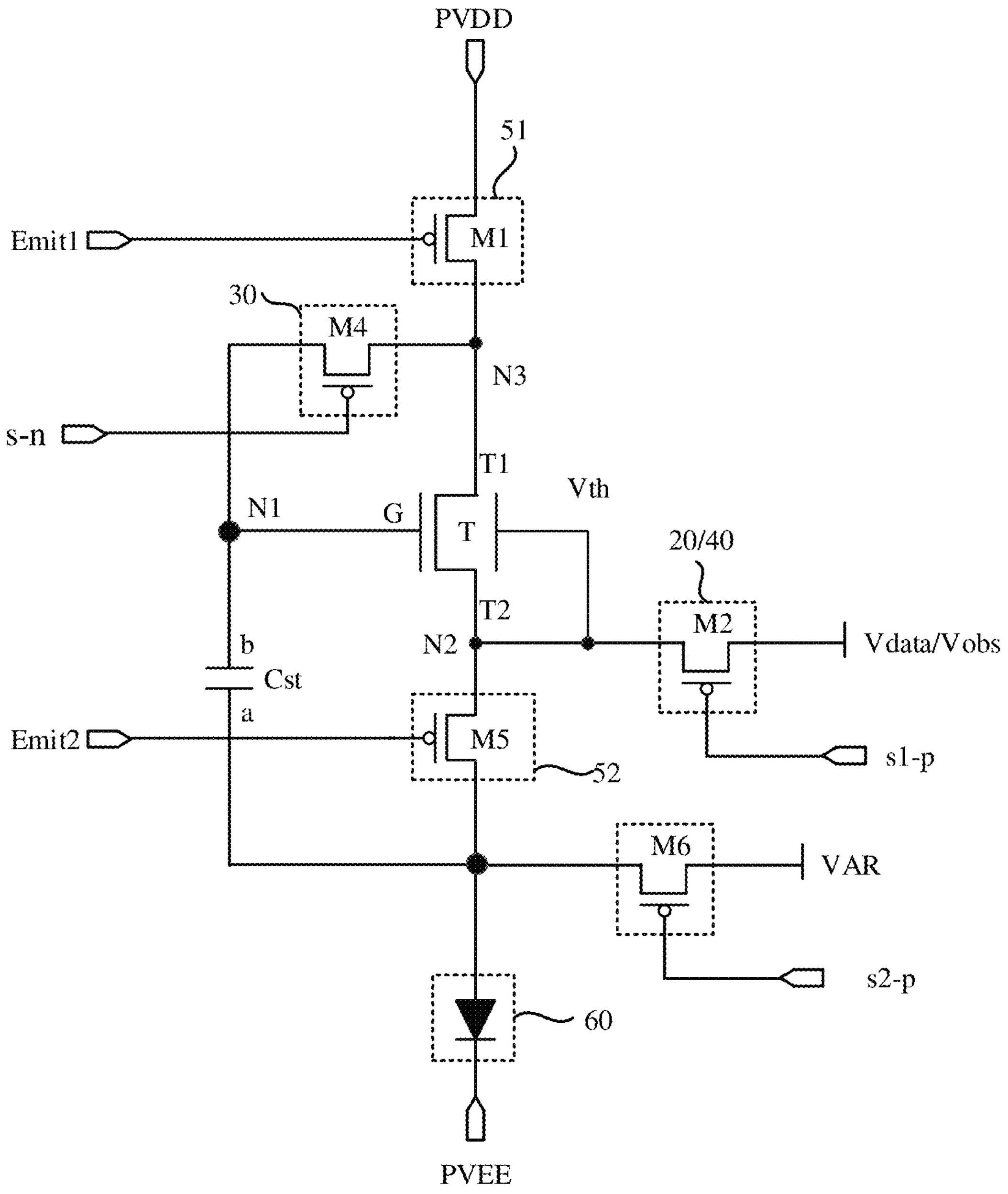
FIG. 18 is a structural diagram of a pixel circuit in a display panel according to an embodiment of the present disclosure.
Figure 19:
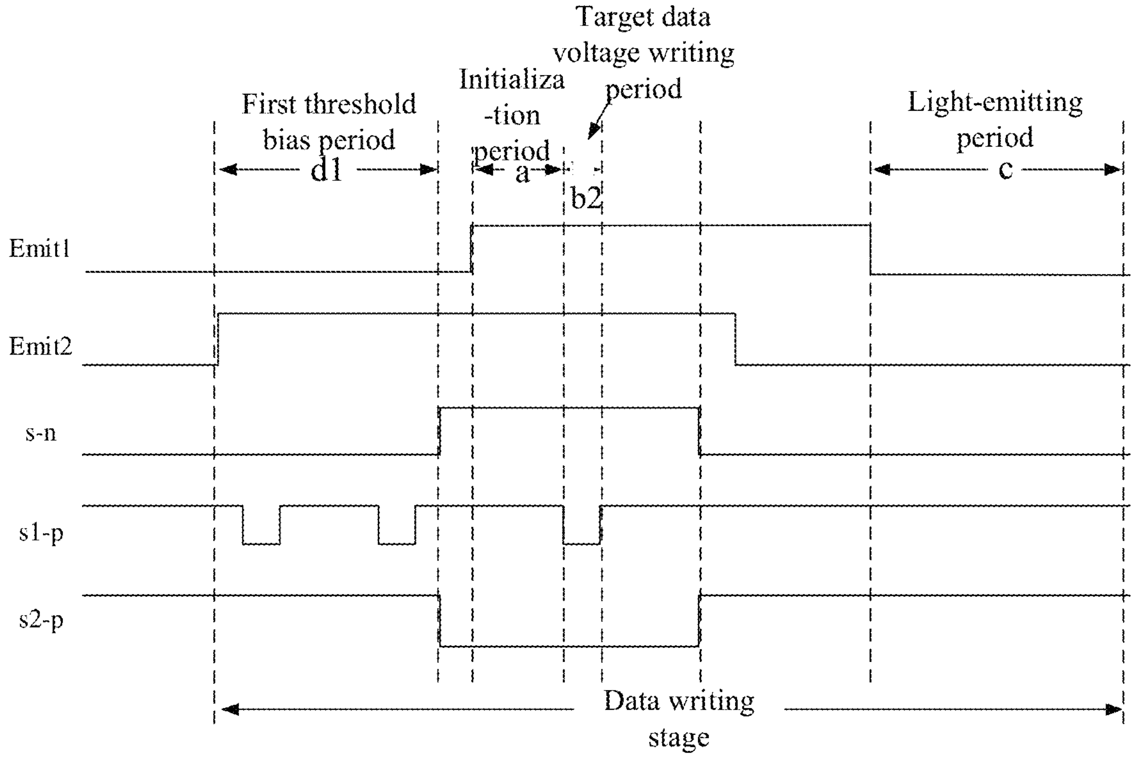
FIG. 19 is a timing diagram of another data write stage according to an embodiment of the present disclosure.

FIG. 18 is a structural diagram of a pixel circuit in a display panel according to an embodiment of the present disclosure. FIG. 19 is a timing diagram of another data write stage according to an embodiment of the present disclosure. Referring to FIG. 18, the pixel circuit includes the drive transistor T, the data write module 20, the light emission control module (51 and 52), the threshold compensation module 30, and the bias adjustment module 40; where the control terminal G of the drive transistor T is electrically connected to the first node N1, the first terminal T1 of the drive transistor T is electrically connected to the second node N2, and the second terminal T2 of the drive transistor T is electrically connected to the third node N3; the data write module 20 is electrically connected between the data signal terminal Vdata and the second node N2 and configured to provide the data signal inputted from the data signal terminal Vdata for the drive transistor T.

The light emission control module (51 and 52) and the drive transistor T are electrically connected between the power signal terminal PVDD and the light-emitting element 60. The light emission control module (51 and 52) is configured to control whether the drive current flows through the light-emitting element 60. The threshold compensation module 30 is electrically connected between the first node N1 and the third node N3 and configured to detect and self-compensate for the deviation of the threshold voltage Vth of the drive transistor T.

The bias adjustment module 40 is electrically connected between the bias adjustment signal terminal Vobs and the second node N2. The control terminal of the bias adjustment module 40 is electrically connected to the first control signal terminal s1-*p*. The bias adjustment module 40 is configured to control the voltage bias of the drive transistor T under the control of the first control signal inputted from the first control signal terminal s1-*p* and the threshold bias adjustment signal inputted from the bias adjustment signal terminal Vobs.

Similarly, in an embodiment, the drive transistor T may be configured to be the N-type transistor; the data write module 20 is reused as the bias adjustment module 40, and the data signal terminal Vdata is reused as the bias adjustment signal terminal Vobs; and the data write module 20 is further configured to provide the second node N2 with the threshold bias adjustment signal Vobs inputted from the data signal terminal Vdata. In addition, it may also be set that the first light emission control module 51 of the light emission control modules and the threshold compensation module 30 are reused as the initialization module, and the power signal terminal PVDD is reused as the initialization signal terminal.

For the preceding pixel circuit, each of the data write stage and the data compensation stage may also include the first threshold bias period and/or the second threshold bias period. At the data write stage, the first threshold bias period precedes the target data voltage writing period, and the second threshold bias period is between the target data voltage writing period and the light-emitting period. At the data compensation stage, the first threshold bias period precedes the compensation data voltage writing period, and the second threshold bias period is between the compensation data voltage writing period and the light-emitting period.

A specific drive timing sequence is described below by still using the data write stage as an example. Referring to FIG. 19, details are provided below.

In the first threshold bias period d1, the bias adjustment module 40 turns on and the bias adjustment signal terminal Vobs inputs the threshold bias adjustment signal Vobs to the second node N2. It is to be noted that in the pixel circuit, the inputted threshold bias adjustment signal Vobs is essentially a data signal Vdata' written by a pixel circuit before the current pixel circuit on the display panel. Apparently, the data signal Vdata' is written to the second node N2, so that the voltage at the second node N2 is essentially lower than the voltage at the first node N1, the drive transistor T turns on, and the signal Vobs is written to the third node N3. Therefore, the voltage at the third node N3 is lower than the voltage at the first node N1 and the drive transistor is reversely conductive, that is, the reverse bias is achieved. At this time, the threshold voltage drift of the drive transistor T weakens, so that the normal light emission in the subsequent light-emitting period can be ensured.

In the initialization period a, the first light emission control module 51 and the threshold compensation module 30 are reused as the initialization module and the power signal terminal PVDD is reused as the initialization signal terminal. At this time, the first light emission control module 51 and the threshold compensation module 30 turn on and the power signal terminal PVDD writes the initialization signal to the first node N1, that is, writes a high-level signal to the first node N1 to achieve initialization.

In the target data voltage writing period b2, the data write module 20 and the threshold compensation module 30 are both on, and the data voltage signal from the data signal terminal Vdata is written to the first node N1 (that is, the first plate a of the storage capacitor Cst and the gate G of the drive transistor T) through the data write module 20, the drive transistor T, and the threshold compensation module 30 in sequence, so that the gate voltage of the drive transistor T gradually increases until a voltage difference between the gate voltage of the drive transistor T and the first terminal T1 of the drive transistor T is equal to the threshold voltage of the drive transistor T, and then the drive transistor T is off.

In the light-emitting period c, the light emission control module (51 and 52) is on, the drive current generated by the drive transistor T flows into the light-emitting element 60, and the light-emitting element 60 emits light in response to the drive current.

For ease of understanding, similarly, the specific structures of the initialization module, the data write module, the threshold compensation module, and the light emission control module in the pixel circuit in FIG. 18 are illustrated here. The data write module 20 includes a second transistor M2, where a gate of the second transistor M2 is electrically connected to the first scanning signal terminal s1-*p*. The data write module 20 is reused as the bias adjustment module 40. In the first threshold bias period d1, the first scanning signal terminal s1-*p* controls the bias adjustment module 40 to turn on. At this time, the threshold bias adjustment signal Vobs, that is, Vdata', is inputted to the third node N3, thereby achieving the reverse conduction of the drive transistor T.

The threshold compensation module 30 and the first light emission control module 51 of the light emission control modules are reused as the initialization module. The threshold compensation module 30 may be configured to be a fourth transistor M4 and specifically the N-type transistor. A gate of the fourth transistor M4 is electrically connected to the third scanning signal terminal s-n. The first light emission control module 51 may specifically be a first transistor M1, where a gate of the first transistor M1 is electrically connected to a first light emission control signal Emit1. In the initialization period a, the third scanning signal terminal s-n and the first light emission control signal Emit1 control the fourth transistor M4 and the first transistor M1 to turn on, respectively, so as to write the high-level initialization signal Vini (which is essentially the PVDD) to the first node N1.

In the target data voltage writing period b2, the first scanning signal s1-*p* controls the second transistor M2 to turn on and the third scanning signal s-n controls the fourth transistor M4 to turn on. At this time, the data signal terminal Vdata writes a data voltage signal subjected to threshold compensation to the first node N1 through the second transistor M2, the drive transistor T, and the threshold compensation module 30.

The second light emission control module 52 of the light emission control modules may be configured to include a fifth transistor M5, where a gate of the fifth transistor M5 is electrically connected to a second light emission control signal terminal Emit2. In the light-emitting period c, the first light emission control signal Emit1 and a second light emission control signal Emit2 control the first transistor M1 and the fifth transistor M5 to turn on. At this time, the power signal terminal PVDD, the first transistor M1, the drive transistor T, the fifth transistor M5, and the light-emitting element 60 form a conductive channel, and the drive transistor T generates the drive current to drive the light-emitting element 60 to emit light.

Similarly, the driving process of the pixel circuit in FIG. 18 essentially includes the initialization period a, the data write period b, and the light-emitting period c. It is understandable that for the data write stage, the data compensation stage, and the data retention stage in the embodiments of the present disclosure, the value of the data voltage inputted from the data signal terminal may be changed to adjust the data write period b to the compensation data voltage writing period b1 at the data compensation stage. Meanwhile, through the control of related control signals, the data write module 20 and the threshold compensation module 30 may both turn off and the light emission control module (51 and 52) turns on, so that at the data retention stage, the initialization period a and the data write period b are closed and the picture display is performed in the light-emitting period c at the entire data retention stage. In addition, the first threshold bias period d1 and the second threshold bias period d2 may be configured in the data write stage, and the first threshold bias period d1 and the second threshold bias period d2 may also be configured in the data compensation stage, which is not limited here.

It should be noted that, in the embodiment of the present disclosure, as shown in FIG. 14, FIG. 16, and FIG. 18, the bias adjustment module 40 in the pixel circuit is essentially used for adjusting the potentials of the two terminals (T1 and T2) of the driving transistor T, that is, the second node N2 or the third node N3, so as to change the magnitude relationship between the potentials of the second node N2 and the third node N3, reverse-bias the driving transistor T, further improve the threshold voltage of the driving transistor T, weaken the drift phenomenon of the threshold voltage, and ensure normal driving of the driving transistor T for light emission in the subsequent light emission period.

It is to be noted that the above are some embodiments of the present disclosure and the technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, though the present disclosure has been described in detail through the embodiments described above, the present disclosure is not limited to the embodiments described above and may include other equivalent embodiments without departing from the concept of the present disclosure. The scope of the present disclosure is determined by the scope of the appended claims.

What is claimed is:

1. A method for driving a display panel, comprising a plurality of picture update periods, wherein at least one of the plurality of picture update periods comprises a first data write stage, a second data write stage, and a data retention stage;

at least one of the first data write stage precedes at least one of the second data write stage;

at the first data write stage, a gate scanning signal is provided for and a first data voltage is written to a pixel unit;

at the second data write stage, the gate scanning signal is provided for and a second data voltage is written to the pixel unit, wherein the first data voltage is less than the second data voltage, wherein theoretical brightness corresponding to the first data voltage is greater than theoretical brightness corresponding to the second data voltage.

2. The method for driving a display panel of claim 1, wherein the first data write stage is a data compensation stage, a same picture update period of the plurality of picture update periods comprises a plurality of the data compensation stages, the plurality of the data compensation stages comprises a first data compensation stage and a second data compensation stage, the first data compensation stage precedes the second data compensation stage, and theoretical brightness corresponding to the first data voltage written at the first data compensation stage is greater than theoretical brightness corresponding to the first data voltage written at the second data compensation stage.

3. The method for driving a display panel of claim 1, wherein the first data write stage is a data compensation stage, a same picture update period of the plurality of picture update periods comprises a plurality of the data compensation stages, the plurality of the data compensation stages comprises a third data compensation stage and a fourth data compensation stage, the third data compensation stage precedes the fourth data compensation stage, and the first data voltage written at the fourth data compensation stage is equal to the first data voltage written at the third data compensation stage.

4. The method for driving a display panel of claim 1, wherein the plurality of picture update periods comprises at least one first picture update period and at least one second picture update period; wherein brightness of each of the at least one first picture update period is greater than brightness of a previous picture update period, and each of the at least one first picture update period comprises the first data write stage, the second data write stage, and the data retention stage; and brightness of each of the at least one second picture update period is less than or equal to brightness of a previous picture update period, and each of the at least one second picture update period comprises the data write stage and the data retention stage.

5. The method for driving a display panel of claim 1, wherein the first data write stage is a data compensation stage, a same picture update period of the plurality of picture update periods comprises a plurality of data compensation stages, and first data voltages written in correspondence to the plurality of data compensation stages are in an arithmetic sequence, a geometric sequence, or an exponential sequence.

6. The method for driving a display panel of claim 1, wherein the display panel comprises a plurality of pixel circuits, and each of plurality of pixel circuits corresponds to a pixel unit;

the plurality of pixel circuits comprises first pixel circuits, and a drive transistor of the first pixel circuit is a silicon-based transistor.

7. The method for driving a display panel of claim 1, wherein the display panel comprises a plurality of pixel circuits, and each of plurality of pixel circuits corresponds to a pixel unit;

the plurality of pixel circuits comprises second pixel circuits, and a drive transistor of the second pixel circuit is an oxide semiconductor transistor.

8. The method for driving a display panel of claim 1, wherein a same picture update period of the plurality of picture update periods comprises a plurality of data compensation stages, a difference between first data voltages written at an ath data compensation stage and an (a+1)th data compensation stage is $\Delta X1$, and a difference between first data voltages written at a bth data compensation stage and a (b+1)th data compensation stage is $\Delta X2$;

wherein $\Delta X1>\Delta X2$, a and b are positive integers greater than 0, and $a+1\leq b$.

9. The method for driving a display panel of claim 1, wherein the first data write stage is a data compensation stage, a same picture update period of the plurality of picture update periods comprises a plurality of data compensation stages and a plurality of data retention stages, wherein at least one of the plurality of data retention stages exists between at least two of the plurality of data compensation stages.

10. The method for driving a display panel of claim 9, wherein a same number of data retention stages of the plurality of data retention stages exist between any adjacent two data compensation stages of the plurality of data compensation stages.

11. The method for driving a display panel of claim 1, wherein the first data write stage is a data compensation stage, a same picture update period of the plurality of picture update periods comprises N data compensation stages, M data retention stages, and P second data write stages; wherein N, M, and P are integers greater than or equal to 1; and n data retention stages of the M data retention stages exist between any adjacent two data compensation stages of the N data compensation stages, where $0\leq n\leq M$.

12. The method for driving a display panel of claim 11, wherein the display panel comprises a plurality of pixel circuits, each of which corresponds to a respective pixel unit; wherein the plurality of pixel circuits comprises a first pixel circuit and a second pixel circuit, a drive transistor in the first pixel circuit is a silicon-based transistor, and a drive transistor in the second pixel circuit is an oxide semiconductor transistor; and in the same picture update period, a proportion of data compensation stages of the first pixel circuit is different from a proportion of data compensation stages of the second pixel circuit.

13. The method for driving a display panel of claim 11, wherein the display panel comprises a plurality of pixel circuits, each of which corresponds to a respective pixel unit; wherein each of the plurality of pixel circuits comprises a drive transistor;

wherein the drive transistor comprises an N-type silicon-based transistor, and a number of the data compensation stages, a number of the data retention stages, and a number of the second data write stages satisfy that $N/(N+M+P)\leq 1/6$.

14. The method for driving a display panel of claim 11, wherein the display panel comprises a plurality of pixel circuits, each of which corresponds to a respective pixel unit; wherein each of the plurality of pixel circuits comprises a drive transistor;

wherein the drive transistor comprises a P-type silicon-based transistor, and a number of the data compensation stages, a number of the data retention stages, and a number of the second data write stages satisfy that $N/(N+M+P)\leq 1/12$.

15. The method for driving a display panel of claim 11, wherein the display panel comprises a plurality of pixel circuits, each of which corresponds to a respective pixel unit; wherein each of the plurality of pixel circuits comprises a drive transistor, and the drive transistor comprises an N-type silicon-based transistor and a P-type silicon-based transistor;

the plurality of pixel circuits comprises a third pixel circuit and a fourth pixel circuit, the third pixel circuit comprises the N-type silicon-based transistor, and the fourth pixel circuit comprises the P-type silicon-based transistor; and in the same picture update period, a proportion of data compensation stages of the third pixel circuit is different from a proportion of data compensation stages of the fourth pixel circuit.

16. The method for driving a display panel of claim 11, wherein any adjacent two picture update periods of the plurality of picture update periods comprise a first picture update period and a second picture update period; wherein the first picture update period comprises N1 data compensation stages, M1 data retention stages, and P1 second data write stages, and the second picture update period comprises N2 data compensation stages, M2 data retention stages, and P2 second data write stages;

wherein the first picture update period and the second picture update period satisfy that $N1+M1+P1<N2+M2+P2$ and $N1<N2$.

17. The method for driving a display panel of claim 5, wherein the display panel comprises a first color pixel unit and a second color pixel unit, and under same target brightness, a theoretical data voltage corresponding to the first color pixel unit is less than a theoretical data voltage corresponding to the second color pixel unit; wherein first data voltages written to the first color pixel unit at the plurality of data compensation stages are in a first arithmetic sequence, and compensation data voltages written to the second color pixel unit at the plurality of data compensation stages are in a second arithmetic sequence; the first arithmetic sequence comprises N1 terms, with a common difference being d1 and an initial term being a1, and the second arithmetic sequence comprises N2 terms, with a common difference being d2 and an initial term being a2; and the first arithmetic sequence and the second arithmetic sequence satisfy that $a1=a2$, $d1=d2$, and $N1<N2$, that $a1=a2$, $d1<d2$, and $N1=N2$, or that $a1<a2$, $d1=d2$, and $N1=N2$.

18. The method for driving a display panel of claim 5, wherein the display panel comprises a first color pixel unit and a second color pixel unit, and under same target brightness, a theoretical data voltage corresponding to the first color pixel unit is less than a theoretical data voltage corresponding to the second color pixel unit; wherein a difference between first data voltages corresponding to adjacent two data compensation stages of the first color pixel unit is greater than a difference between first data voltages corresponding to adjacent two data compensation stages of the second color pixel unit; or a first data voltage corresponding to the first color pixel unit at an initial data compensation stage is less than a first data voltage corresponding to the second color pixel unit at the initial data compensation stage; or a number of data compensation stages of the first color pixel unit is greater than a number of data compensation stages of the second color pixel unit.

19. The method for driving a display panel of claim 1, wherein the second data write stage comprises at least a second data voltage writing period and a light-emitting period;

the first data write stage comprises at least a first data voltage writing period and the light-emitting period; and the data retention stage comprises at least the light-emitting period.

20. The method for driving a display panel of claim 19, wherein each of the first data write stage and the second data write stage further comprises a first threshold bias period and/or a second threshold bias period; wherein at the second data write stage, the first threshold bias period precedes the second data voltage writing period, and the second threshold bias period is between the second data voltage writing period and the light-emitting period; and at the first data write stage, the first threshold bias period precedes the first data voltage writing period, and the second threshold bias period is between the first data voltage writing period and the light-emitting period.

21. A pixel circuit, wherein the pixel circuit comprise a plurality of picture update periods, at least one of the plurality of picture update periods comprises a first data write stage, a second data write stage, and a data retention stage;

at least one of the first data write stage precedes at least one of the second data write stage;

at the first data write stage, the pixel circuit receives a gate scanning signal and is written with a first data voltage;

at the second data write stage, the pixel circuit receives the gate scanning signal and is written with a second data voltage, wherein theoretical brightness corresponding to the first data voltage is greater than theoretical brightness corresponding to the second data voltage.

22. The pixel circuit of claim 21, wherein the pixel circuit includes a drive transistor, a data write module, a light emission control module, a threshold compensation module and a bias adjustment module;

the data write module is configured to provide a data signal to the drive transistor;

the light emission control module and the drive transistor are electrically connected between a power signal terminal and a light-emitting element, and the light emission control module is configured to control whether a drive current flows through the light-emitting element;

the threshold compensation module is electrically connected between a first node and a third node and configured to detect and self-compensate for a deviation of a threshold voltage of the drive transistor;

a control terminal of the drive transistor is electrically connected to the first node, a first terminal of the drive transistor is electrically connected to a second node, and a second terminal of the drive transistor is electrically connected to the third node; the drive transistor is configured to generate drive current;

wherein the bias adjustment module is electrically connected between a bias adjustment signal terminal and the third node or between the bias adjustment signal terminal and the second node, and the bias adjustment module is configured to provide signal of the bias adjustment signal terminal to the third node to adjust a bias state of the drive transistor.

23. The pixel circuit of claim 21, wherein the pixel circuit comprise a first pixel circuit, and a drive transistor of the first pixel circuit is a silicon-based transistor.

24. The pixel circuit of claim 21, wherein the pixel circuit comprise a second pixel circuit, and a drive transistor of the second pixel circuit is an oxide semiconductor transistor.

25. The pixel circuit of claim 21, wherein the plurality of picture update periods comprises at least one first picture update period and at least one second picture update period; wherein brightness of each of the at least one first picture update period is greater than brightness of a previous picture update period, and each of the at least one first picture update period comprises the first data write stage, the second data write stage, and the data retention stage; and brightness of each of the at least one second picture update period is less than or equal to brightness of a previous picture update period, and each of the at least one second picture update period comprises the second data write stage and the data retention stage.

26. A pixel circuit, wherein at least one of picture update period of the pixel circuit comprises a first data write stage, a second data write stage, and a data retention stage;

at least one of the first data write stage precedes at least one of the second data write stage;

at the first data write stage, the pixel circuit receives a gate scanning signal and is written with a first data voltage;

at the second data write stage, the pixel circuit receives the gate scanning signal and is written with a second data voltage, wherein theoretical brightness corresponding to the first data voltage is greater than theoretical brightness corresponding to the second data voltage;

wherein the pixel circuit comprises a drive transistor and a bias adjustment module, the bias adjustment module is electrically connected to a first terminal of the drive transistor or a second terminal of the drive transistor.

27. The pixel circuit of claim 26, wherein a control terminal of the bias adjustment module is electrically connected to a second control signal terminal, and is configured to provide signal of bias adjustment signal terminal to the first terminal of the drive transistor or the second terminal of the drive transistor under control of signal of the second control signal terminal.

28. The pixel circuit of claim 26, wherein the pixel circuit further includes a data write module;

the data write module is electrically connected to the first terminal of the drive transistor or the second terminal of the drive transistor.

29. The pixel circuit of claim 26, wherein

The bias adjustment module is electrically connected to one of the first terminal or the second terminal of the drive transistor; the data write module is electrically connected to the other of the first terminal or the second terminal of the drive transistor.

30. The pixel circuit of claim 26, wherein the bias adjustment module is reused as a data write module;

the bias adjustment module is configured to provide signal of bias adjustment signal terminal to a second node, to adjust a bias state of the drive transistor;

the data write module is configured to provide a data signal to the drive transistor.

31. The pixel circuit of claim 26, wherein a drive transistor of the pixel circuit is a silicon-based transistor.

32. The pixel circuit of claim 26, wherein a drive transistor of the pixel circuit is an oxide semiconductor transistor.

33. A display panel, comprising:

a plurality of pixel units and a plurality of picture update periods, at least one of the plurality of picture update periods comprises a first data write stage, a second data write stage, and a data retention stage; at least one of the first data write stage precedes at least one of the second data write stage;

a scanning drive unit configured to provide a gate scanning signal for each of the plurality of pixel units at the first data write stage and the second data write stage, separately; and a data write unit, wherein the data write unit is configured to write a first data voltage to the each of the plurality of pixel units at the first data write stage; and the data write unit is further configured to write a second data voltage to the each of the plurality of pixel units at the second data write stage, wherein theoretical brightness corresponding to the first data voltage is greater than theoretical brightness corresponding to the second data voltage.

34. The display panel of claim 33, wherein the display panel comprises a plurality of pixel circuits electrically connected to the plurality of pixel units; wherein each of the plurality of pixel circuits comprises:

a drive transistor, a data write module, a light emission control module, and a threshold compensation module; wherein a control terminal of the drive transistor is electrically connected to a first node, a first terminal of the drive transistor is electrically connected to a second node, and a second terminal of the drive transistor is electrically connected to a third node;

the data write module is electrically connected between a data signal terminal and the second node; the threshold compensation module is electrically connected between the first node and the third node; and the data write module is configured to provide a data signal inputted from the data signal terminal for the drive transistor;

the threshold compensation module is configured to compensate the first node with a threshold voltage of the drive transistor; and the light emission control module and the drive transistor are electrically connected between a power signal terminal and a light-emitting element, and the light emission control module is configured to control whether a drive current flows through the light-emitting element.

35. The display panel of claim 33, wherein the display panel comprises a plurality of pixel circuits electrically connected to the plurality of pixel units; wherein each of the plurality of pixel circuits comprises:

a drive transistor, a data write module, a light emission control module, a threshold compensation module, and a bias adjustment module; wherein a control terminal of the drive transistor is electrically connected to a first node, a first terminal of the drive transistor is electrically connected to a second node, and a second terminal of the drive transistor is electrically connected to a third node;

the data write module is electrically connected between a data signal terminal and the second node and configured to provide a data signal inputted from the data signal terminal for the drive transistor;

the light emission control module and the drive transistor are electrically connected between a power signal terminal and a light-emitting element, and the light emission control module is configured to control whether a drive current flows through the light-emitting element;

the threshold compensation module is electrically connected between the first node and the third node and configured to detect and self-compensate for a deviation of a threshold voltage of the drive transistor; and the bias adjustment module is electrically connected between a bias adjustment signal terminal and the second node or between the bias adjustment signal terminal and the third node; a control terminal of the bias adjustment module is electrically connected to a first control signal terminal, and the bias adjustment module is configured to control a voltage bias of the drive transistor under the control of a first control signal inputted from the first control signal terminal and a threshold bias adjustment signal inputted from the bias adjustment signal terminal.

36. The display panel of claim 33, wherein the drive transistor is an N-type transistor; and the threshold compensation module and the bias adjustment module are reused as an initialization module for resetting the first node.

37. The display panel of claim 33, wherein the drive transistor is an N-type transistor;

the data write module is reused as the bias adjustment module, and the data signal terminal is reused as the bias adjustment signal terminal; and the data write module is further configured to provide the second node with the threshold bias adjustment signal inputted from the data signal terminal.

38. The display panel of claim 33, wherein the drive transistor is a P-type transistor; and the threshold compensation module and the bias adjustment module are reused as an initialization module for resetting the first node.

* * * * *